US008995442B2

(12) United States Patent
Hikichi et al.

(10) Patent No.: US 8,995,442 B2

(45) Date of Patent: Mar. 31, 2015

(54) APPARATUS AND METHOD FOR TRANSLATING AN ADDRESS OF A PACKET TRANSFERRED BETWEEN NETWORKS

(75) Inventors: Kenji Hikichi, Kawasaki (JP); Shinya Kano, Inagi (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 13/561,467

(22) Filed: Jul. 30, 2012

(65) Prior Publication Data

US 2013/0034099 A1 Feb. 7, 2013

(30) Foreign Application Priority Data

Aug. 1, 2011 (JP) ................................ 2011-168556

(51) Int. Cl.
*H04L 12/56* (2006.01)
*H04L 29/12* (2006.01)

(52) U.S. Cl.
CPC ........ *H04L 61/2514* (2013.01); *H04L 61/2532* (2013.01)
USPC .......................................... 370/392; 709/235

(58) Field of Classification Search
CPC ........................ H04L 61/256; H04L 29/12386
USPC .......... 370/401, 389, 245, 392, 393; 709/235, 709/245
See application file for complete search history.

(56) References Cited

U.S. PATENT DOCUMENTS 6,891,839 B2 * 5/2005 Albert et al. .................. 370/401
7,280,557 B1 10/2007 Biswas et al.
8,194,674 B1 * 6/2012 Pagel et al. .................. 370/393
2001/0036184 A1 11/2001 Kinoshita et al.
2003/0101275 A1 * 5/2003 Maciel .......................... 709/235
2006/0050700 A1 * 3/2006 Ravikumar et al. ........... 370/389

(Continued)

FOREIGN PATENT DOCUMENTS

JP 2001-274834 10/2001
JP 2002-094546 3/2002

(Continued)

OTHER PUBLICATIONS

U.S. Appl. No. 13/534,098, filed Jun. 27, 2012, Kitada, Fujitsu Limited.

(Continued)

*Primary Examiner* — Khaled Kassim
*Assistant Examiner* — Parth Patel
(74) *Attorney, Agent, or Firm* — Staas & Halsey LLP

(57) ABSTRACT

An apparatus translates a destination address of a first packet that is transferred from an external communication device in an external network to an internal communication device in an internal network through the external network, from an external-network address that has been assigned to the internal communication device using an addressing scheme for the external network, to an internal address that has been assigned to the internal communication device using an addressing scheme for the internal network. The apparatus transmits, to another apparatus, address information including the external-network address and identifier information for identifying the external communication device where the another apparatus is configured to translate a source address of a second packet that is transferred from the internal communication device to the external communication device, from the internal address to the external address.

9 Claims, 25 Drawing Sheets

(56) References Cited

U.S. PATENT DOCUMENTS

| | | | | |
|---|---|---|---|---|
| 2007/0233896 | A1 | 10/2007 | Hilt et al. | |
| 2008/0071927 | A1* | 3/2008 | Lee | 709/245 |
| 2009/0031042 | A1* | 1/2009 | Phatak | 709/245 |
| 2010/0061380 | A1 | 3/2010 | Barach et al. | |
| 2010/0251335 | A1* | 9/2010 | Srisuresh et al. | 726/3 |
| 2011/0103394 | A1* | 5/2011 | Vogt et al. | 370/401 |
| 2013/0039365 | A1* | 2/2013 | Kitada | 370/392 |
| 2014/0059068 | A1 | 2/2014 | Anderson, IV | |

FOREIGN PATENT DOCUMENTS

| | | |
|---|---|---|
| JP | 2010-114585 | 5/2010 |
| JP | 2010-278584 | 12/2010 |

OTHER PUBLICATIONS

Office Action issued Apr. 23, 2014 in U.S. Appl. No. 13/534,098.

Japanese Office Action issued Feb. 3, 2015 in corresponding Japanese Patent Application No. 2011-168556.

* cited by examiner

INTERNAL HOST MANAGEMENT TABLE
6
1
HOST MANAGEMENT SERVER
5
FIRST INTERNAL HOST
4a
SECOND INTERNAL HOST
4b
2
DNS RECORD
93
NAT1
NAT2
NAT3
3a
3b
3c
DNS SERVER
92
90
91

| INTERNAL HOST | ADDRESS TRANSLATION DEVICE |
|---|---|
| IDENTIFIER OF FIRST INTERNAL HOST | ADDRESS OF NAT1 |
| IDENTIFIER OF SECOND INTERNAL HOST | ADDRESS OF NAT2 |
| ..... | ..... |

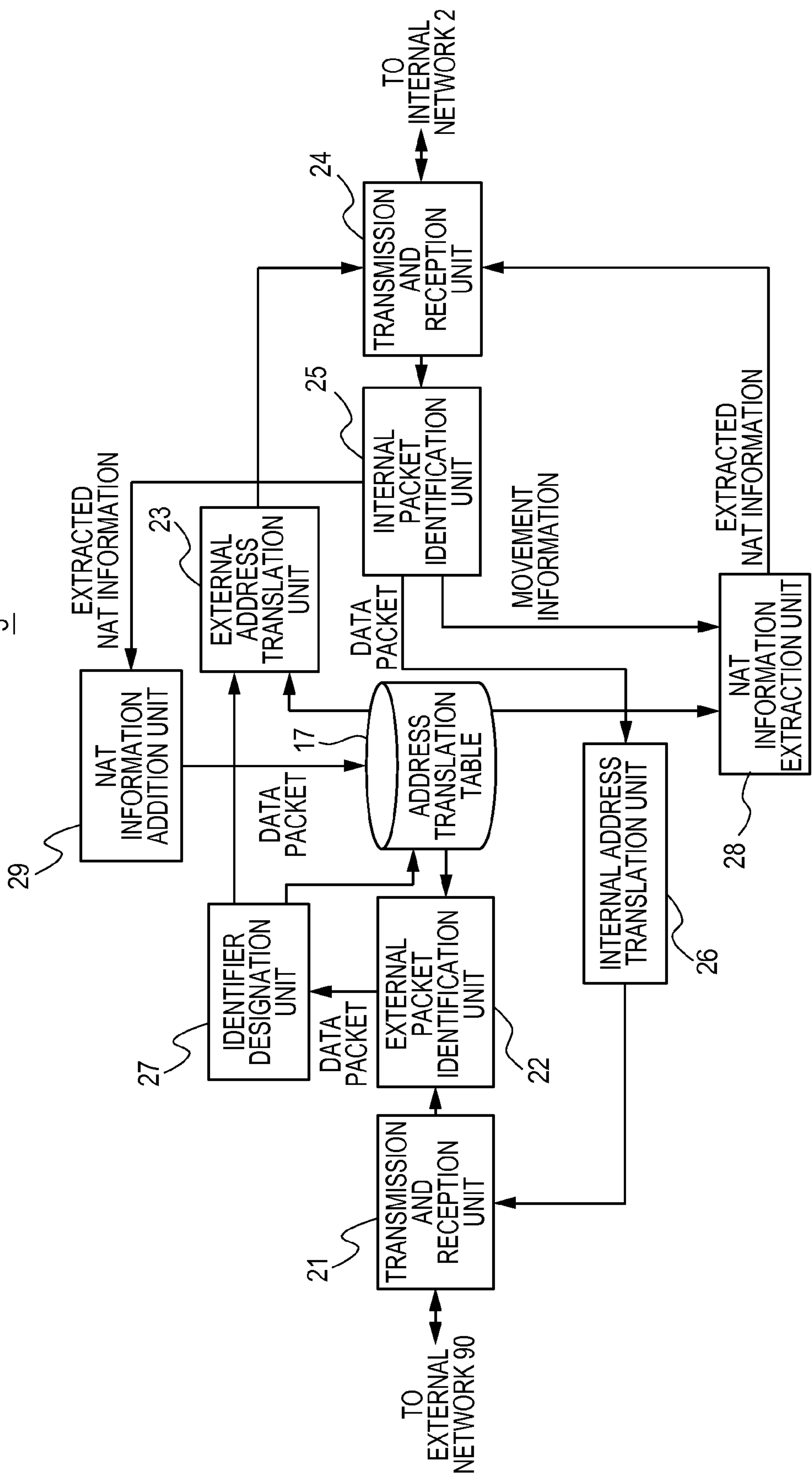
FIG. 4
3
TO INTERNAL NETWORK 2
24
TRANSMISSION AND RECEPTION UNIT
25
INTERNAL PACKET IDENTIFICATION UNIT
EXTRACTED NAT INFORMATION
23
EXTERNAL ADDRESS TRANSLATION UNIT
DATA PACKET
MOVEMENT INFORMATION
EXTRACTED NAT INFORMATION
NAT INFORMATION EXTRACTION UNIT
28
NAT INFORMATION ADDITION UNIT
29
17
ADDRESS TRANSLATION TABLE
DATA PACKET
INTERNAL ADDRESS TRANSLATION UNIT
26
IDENTIFIER DESIGNATION UNIT
27
EXTERNAL PACKET IDENTIFICATION UNIT
22
DATA PACKET
TRANSMISSION AND RECEPTION UNIT
21
TO EXTERNAL NETWORK 90

FIG. 5

| INTERNAL HOST | | EXTERNAL HOST |
|---|---|---|
| INTERNAL ADDRESS | EXTERNAL ADDRESS | EXTERNAL ADDRESS |
| A | a1 | c |
| ..... | ..... | ..... |

FIG. 6

| IDENTIFIER OF HOST TO MOVE | ADDRESS OF HOST TO MOVE | ADDRESS OF ADDRESS TRANSLATION DEVICE |
|---|---|---|

FIG. 7

| INTERNAL ADDRESS OF INTERNAL HOST | EXTERNAL ADDRESS OF INTERNAL HOST | EXTERNAL ADDRESS OF EXTERNAL HOST |
|---|---|---|
| A | a1 | c |

1
6
INTERNAL HOST MANAGEMENT TABLE
MOVEMENT
5
HOST MANAGEMENT SERVER
4a
FIRST INTERNAL HOST
4b
SECOND INTERNAL HOST
4a
FIRST INTERNAL HOST
A
c
111
2
102
c
A
3a
NAT1
3b
NAT2
NAT3
3c
DNS RECORD
93
DNS SERVER
92
101
c
a1
112
a1
c
90
100
110
91

FIG. 9A

| INTERNAL HOST | | EXTERNAL HOST |
|---|---|---|
| INTERNAL ADDRESS | EXTERNAL ADDRESS | EXTERNAL ADDRESS |
| A | a1 | c |

FIG. 9B

| INTERNAL HOST | | EXTERNAL HOST |
|---|---|---|
| INTERNAL ADDRESS | EXTERNAL ADDRESS | EXTERNAL ADDRESS |
| B | b2 | x |

FIG. 9C

| INTERNAL HOST | | EXTERNAL HOST |
|---|---|---|
| INTERNAL ADDRESS | EXTERNAL ADDRESS | EXTERNAL ADDRESS |
| B | b2 | x |
| A | a1 | c |

FIG. 13

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| A | a1 | PA12 | c |
| ..... | ..... | ..... | ..... |

FIG. 14

| ADDRESS | USAGE FLAG |
|---|---|
| PA11 | USED |
| PA12 | UNUSED |
| ..... | ..... |

1
6
INTERNAL HOST MANAGEMENT TABLE
MOVEMENT
4a
5
HOST MANAGEMENT SERVER
FIRST INTERNAL HOST
102
PA12
A
4b
SECOND INTERNAL HOST
4a
FIRST INTERNAL HOST
111
A
PA12
2
3a
NAT1
3b
NAT2
NAT3
3c
DNS RECORD
93
DNS SERVER
92
101
c
a1
112
a1
c
90
100
110
91

FIG. 16A

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| A | a1 | PA12 | c |

FIG. 16B

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| B | b2 | PA21 | x |

FIG. 16C

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| B | b2 | PA21 | x |
| A | a1 | PA12 | c |

FIG. 17

| INTERNAL ADDRESS OF INTERNAL HOST | EXTERNAL ADDRESS OF INTERNAL HOST | INTERNAL ADDRESS OF EXTERNAL HOST | EXTERNAL ADDRESS OF EXTERNAL HOST |
|---|---|---|---|
| A | a1 | PA12 | c |

FIG. 20

| INTERNAL HOST | | EXTERNAL HOST | |
|---|---|---|---|
| INTERNAL IP ADDRESS | EXTERNAL IP ADDRESS | EXTERNAL IP ADDRESS | EXTERNAL PORT |
| A | a1 | c | 90 |
| ····· | ····· | ····· | ····· |

1
2
6
INTERNAL HOST MANAGEMENT TABLE
MOVEMENT
5
HOST MANAGEMENT SERVER
FIRST INTERNAL HOST
4a
4b
SECOND INTERNAL HOST
4a
FIRST INTERNAL HOST
A 80 c 90
111
c 90 A 80
102
NAT1
3a
NAT2
3b
NAT3
3c
93
DNS RECORD
92
DNS SERVER
c 90 a1 80
101
112
a1 80 c 90
90
100
110
91

FIG. 22A

| INTERNAL HOST | | EXTERNAL HOST | |
|---|---|---|---|
| INTERNAL IP ADDRESS | EXTERNAL IP ADDRESS | EXTERNAL IP ADDRESS | EXTERNAL PORT |
| A | a1 | c | 90 |

FIG. 22B

| INTERNAL HOST | | EXTERNAL HOST | |
|---|---|---|---|
| INTERNAL IP ADDRESS | EXTERNAL IP ADDRESS | EXTERNAL IP ADDRESS | EXTERNAL PORT |
| B | b2 | x | 70 |

FIG. 22C

| INTERNAL HOST | | EXTERNAL HOST | |
|---|---|---|---|
| INTERNAL IP ADDRESS | EXTERNAL IP ADDRESS | EXTERNAL IP ADDRESS | EXTERNAL PORT |
| B | b2 | x | 70 |
| A | a1 | c | 90 |

FIG. 23

| INTERNAL IP ADDRESS OF INTERNAL HOST | EXTERNAL IP ADDRESS OF INTERNAL HOST | EXTERNAL IP ADDRESS OF EXTERNAL HOST | EXTERNAL PORT OF EXTERNAL HOST |
|---|---|---|---|
| A | a1 | c | 90 |

FIG. 24

| INTERNAL HOST | | EXTERNAL HOST | | | |
|---|---|---|---|---|---|
| INTERNAL IP ADDRESS | EXTERNAL IP ADDRESS | INTERNAL IP ADDRESS | INTERNAL PORT | EXTERNAL IP ADDRESS | EXTERNAL PORT |
| A | a1 | PA12 | p2 | c | 90 |
| ..... | ..... | ..... | ..... | ..... | ..... |

FIG. 25

| IP ADDRESS | PORT | USAGE FLAG |
|---|---|---|
| PA11 | p1 | USED |
| PA11 | p2 | USED |
| PA12 | p1 | UNUSED |
| ····· | ····· | ····· |

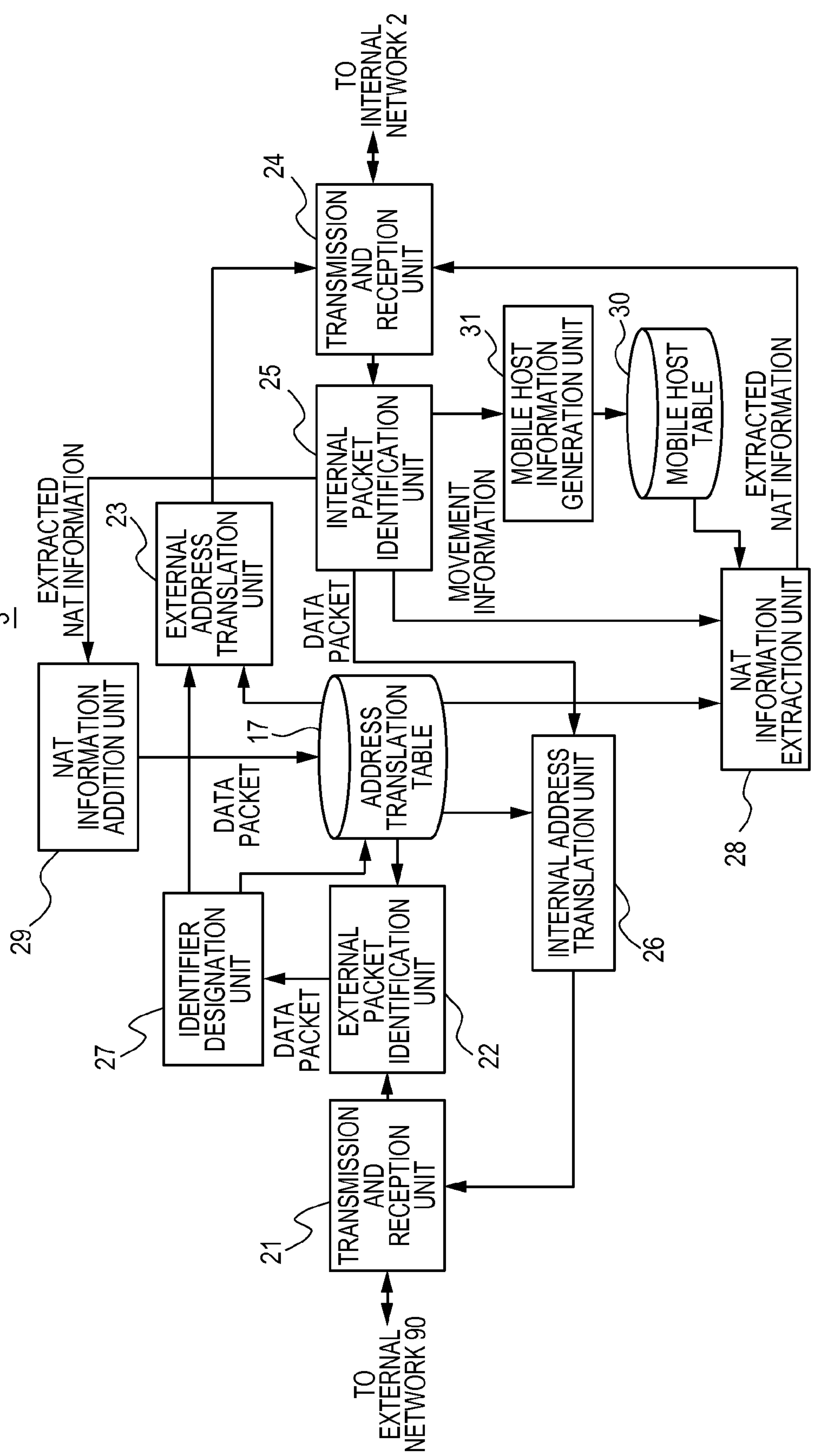
FIG. 26
3
TO INTERNAL NETWORK 2
24
TRANSMISSION AND RECEPTION UNIT
25
INTERNAL PACKET IDENTIFICATION UNIT
31
MOBILE HOST INFORMATION GENERATION UNIT
30
MOBILE HOST TABLE
EXTRACTED NAT INFORMATION
MOVEMENT INFORMATION
EXTRACTED NAT INFORMATION
23
EXTERNAL ADDRESS TRANSLATION UNIT
DATA PACKET
NAT INFORMATION ADDITION UNIT
17
ADDRESS TRANSLATION TABLE
DATA PACKET
NAT INFORMATION EXTRACTION UNIT
INTERNAL ADDRESS TRANSLATION UNIT
28
29
IDENTIFIER DESIGNATION UNIT
EXTERNAL PACKET IDENTIFICATION UNIT
26
DATA PACKET
27
22
TRANSMISSION AND RECEPTION UNIT
21
TO EXTERNAL NETWORK 90

FIG. 27

| INTERNAL HOST | | ADDRESS TRANSLATION DEVICE |
|---|---|---|
| INTERNAL ADDRESS | EXTERNAL ADDRESS | |
| A | a1 | ADDRESS OF NAT2 |
| ..... | ..... | ..... |

1
2
6
INTERNAL HOST MANAGEMENT TABLE
MOVEMENT
5
HOST MANAGEMENT SERVER
4a
FIRST INTERNAL HOST
142
PA13
A
4b
SECOND INTERNAL HOST
FIRST INTERNAL HOST
4a
93
DNS RECORD
3a
NAT1
3b
NAT2
A
PA13
151
NAT3
3c
92
DNS SERVER
d
a1
141
152
a1
d
90
140
150
91
95

FIG. 29A

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| A | a1 | PA12 | c |
| A | a1 | PA13 | d |

FIG. 29B

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| B | b2 | PA21 | x |
| A | a1 | PA12 | c |

FIG. 29C

| INTERNAL HOST | | EXTERNAL HOST | |
|---|---|---|---|
| INTERNAL ADDRESS | EXTERNAL ADDRESS | INTERNAL ADDRESS | EXTERNAL ADDRESS |
| B | b2 | PA21 | x |
| A | a1 | PA12 | c |
| A | a1 | PA13 | d |

FIG. 30

| INTERNAL HOST | | EXTERNAL HOST | | DELETION TIME |
|---|---|---|---|---|
| INTERNAL ADDRESS | EXTERNAL ADDRESS | INTERNAL ADDRESS | EXTERNAL ADDRESS | |
| A | a1 | PA12 | c | 3/31/2011 9:21 |
| ····· | ····· | ····· | ····· | ····· |

FIG. 31

| IDENTIFIER OF HOST TO MOVE | ADDRESS OF HOST TO MOVE | ADDRESS OF ADDRESS TRANSLATION DEVICE | TTL |
|---|---|---|---|

APPARATUS AND METHOD FOR TRANSLATING AN ADDRESS OF A PACKET TRANSFERRED BETWEEN NETWORKS

CROSS-REFERENCE TO RELATED APPLICATION

This application is based upon and claims the benefit of priority of the prior Japanese Patent Application No. 2011-168556, filed on Aug. 1, 2011, the entire contents of which are incorporated herein by reference.

FIELD

The embodiments discussed herein are related to apparatus and method for translating an address of a packet transferred between networks.

BACKGROUND

NAT (Network Address Translation) devices have been known each of which performs translation between a network address used on one network and a network address used on another network, at a connection point connecting different networks. In addition, multi-homed networks have been known each of which is connected to another network through a plurality of connection points.

In addition, a communication method has been known where when a terminal movable among different networks performs packet transmission between any different networks, a transmission source address of a packet transmitted by the terminal is translated into a same global address. In a first network, a first address change mechanism is provided that changes the transmission source address of a packet transmitted from the terminal, to the global address of a packet. In addition, a second address change mechanism is provided in a second network, and when the terminal has moved from the first network to the second network, the second address change mechanism changes the transmission source address of a packet transmitted from the terminal, to the same address as the global address. The second address change mechanism detects that a registration request has been transmitted from the terminal to a mobile IP agent of the second network, and after the detection, the second address change mechanism acquires the global address from the first address change mechanism. Alternatively, the second address change mechanism detects that a registration response has been transmitted from a mobile IP agent of the first network to the mobile IP agent of the second network, and after the detection, the second address change mechanism acquires the global address from the first address change mechanism.

An address translation method has been known where in a home network, a home agent and an address translation function unit are provided and in a foreign network of a movement destination, a foreign agent and an address translation function unit are provided. The foreign network inquires of the agent of the home network about the global address of a mobile terminal that has moved to the foreign network, and stores the global address of the mobile terminal in the address translation function unit. Examples of such methods include techniques disclosed in Japanese Laid-open Patent Publication No. 2001-274834 and Japanese Laid-open Patent Publication No. 2002-94546.

SUMMARY

According to an aspect of the invention, there is provided an apparatus for translating an address of a packet transferred between networks. The apparatus translates a destination address of a first packet that is transferred from an external communication device in an external network to an internal communication device in an internal network through the external network, from an external-network address that has been assigned to the internal communication device using an addressing scheme for the external network, to an internal-network address that has been assigned to the internal communication device using an addressing scheme for the internal network. The apparatus transmits, to another apparatus, address information including the external-network address and identifier information for identifying the external communication device where the another apparatus is configured to translate a source address of a second packet that is transferred from the internal communication device to the external communication device, from the internal-network address to the external-network address.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a configuration example of an address translation device, according to a first embodiment;

FIG. 5 is a diagram illustrating an example of an address translation table, according to a first embodiment;

FIG. 6 is a diagram illustrating an example of movement information, according to a first embodiment;

FIG. 7 is a diagram illustrating an example of extracted NAT information, according to a first embodiment;

FIGS. 9A to 9C are diagrams each illustrating an example of an address translation table, according to a first embodiment;

FIG. 13 is a diagram illustrating an example of an address translation table, according to a second embodiment;

FIG. 14 is a diagram illustrating an example of a pool address table, according to a second embodiment;

FIGS. 16A to 16C are diagrams each illustrating an example of an address translation table, according to a second embodiment;

FIG. 17 is a diagram illustrating an example of extracted NAT information, according to a second embodiment;

FIG. 20 is a diagram illustrating an example of an address translation table, according to a third embodiment;

FIGS. 22A to 22C are diagrams each illustrating an example of an address translation table, according to a third embodiment;

FIG. 23 is a diagram illustrating an example of extracted NAT information, according to a third embodiment;

FIG. 24 is a diagram illustrating an example of an address translation table, according to a fourth embodiment;

FIG. 25 is a diagram illustrating an example of a pool address table, according to a fourth embodiment;

FIG. 26 is a diagram illustrating a configuration example of an address translation device, according to a fifth embodiment;

FIG. 27 is a diagram illustrating an example of a mobile host table, according to an embodiment;

FIGS. 29A to 29C are diagrams each illustrating an example of an address translation table, according to a fifth embodiment;

FIG. 30 is a diagram illustrating an example of an address translation table, according to a sixth embodiment; and FIG. 31 is a diagram illustrating an example of movement information, according to a sixth embodiment.

DESCRIPTION OF EMBODIMENTS

Figure 1:
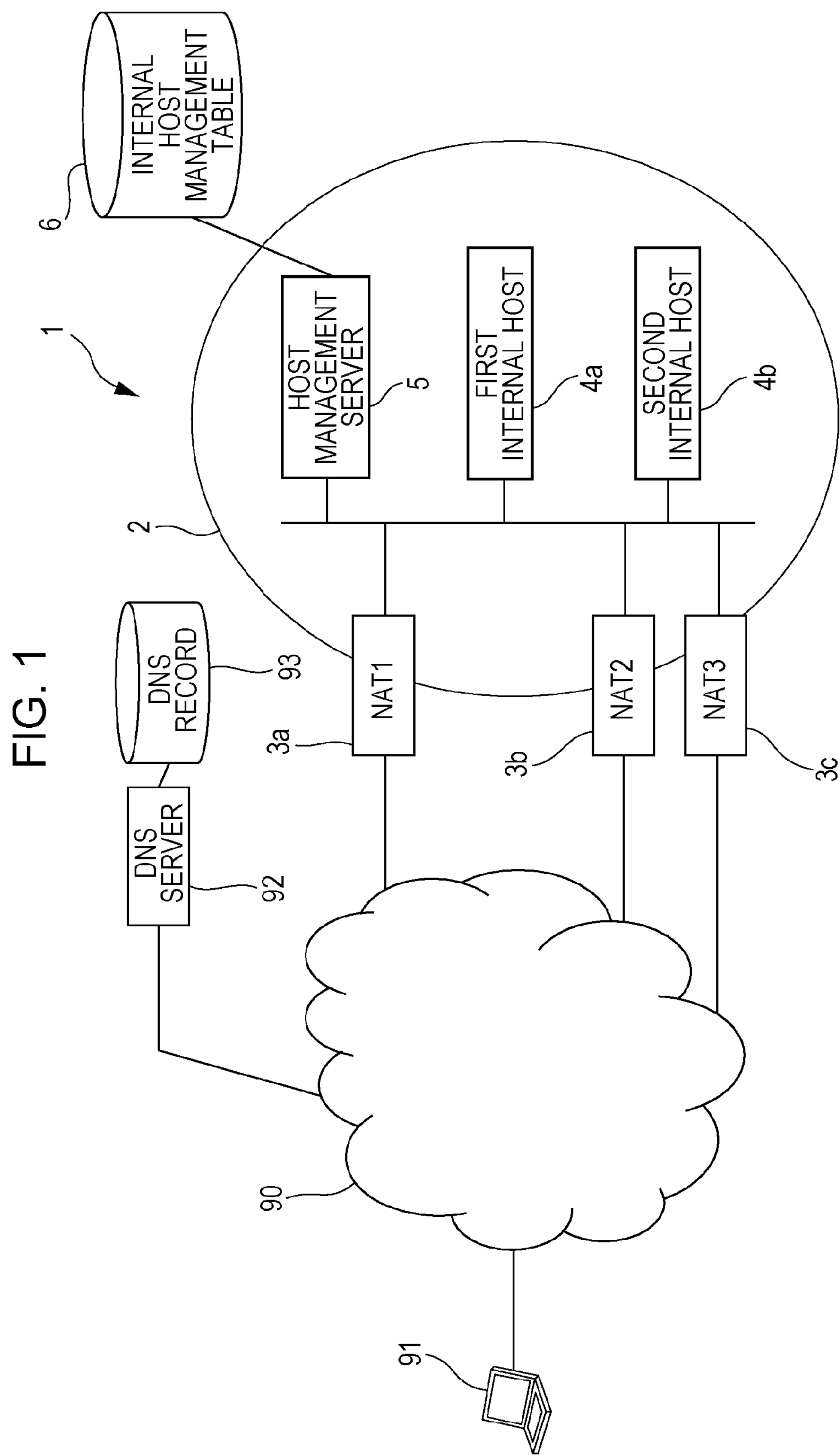
FIG. 1 is a diagram illustrating a configuration example of a communication system, according to an embodiment.

In the following description, a multi-homed network is expressed as an "internal network", and a network connected to the multi-homed network is expressed as an "external network". In addition, an address that is assigned using an addressing scheme for the internal network will be expressed as an "internal address" or "internal-network address", and an address that is assigned using an addressing scheme for the external network will be expresses as an "external address" or "external-network address". In addition, a host in the internal network will be expressed as an "internal host" or "internal communication device", and a host establishing communication with the internal host through the external network will be expressed as an "external host" or "external communication device".

With respect to each internal host in the internal network, one of a plurality of connection points is designated as a connection point through which a packet transmitted from the internal host is to transit. In the present specification, such a connection point is expressed as a "transit connection point", in some cases. An example of the transit connection point is a default gateway.

When the transit connection point of an internal host has been changed, a case where it is difficult to continue communication with an external host occurs in some cases, for the following reasons. When the change of the transit connection point has occurred, the external address of the internal host is changed, from an address assigned to the transit connection point before the change, to an address assigned to a transit connection point after the change. A Domain Name System (DNS) server updates the external address of the internal host. Since it takes a certain amount of time for the update to be transmitted to the external host, a case occurs where, using the external address before the change, the external host transmits a packet after the update of the external address. This packet reaches the transit connection point before the change.

At this time, if the internal host remains in an address translation table, the transit connection point before the change translates the destination address of the packet into the internal address. Accordingly, the packet reaches the internal host. The internal host sends back, to the external host, a response packet corresponding to this packet. This response packet is transmitted to the external network through the transit connection point after the change.

Therefore, the transmission source address of the response packet received by the external host does not match the transmission destination address of the packet transmitted by the external host. Since it is difficult for a host within the external network to identify the transmitted packet and the response packet as packets transmitted and received in the same sequence of communication operations, the host fails to continue communication.

<1. Whole Configuration of Communication System>

Hereinafter, embodiments of the present technology will be described with reference to attached drawings.

FIG. 1 is a diagram illustrating a configuration example of a communication system, according to an embodiment. A communication system 1 includes an internal network 2, a first address translation device 3*a* to a third address translation device 3*c*, a first internal host 4*a*, a second internal host 4*b*, and a host management server 5. In addition, in the following description, the first internal host 4*a* and the second internal host 4*b* will be also collectively expressed as "internal hosts 4".

The internal network 2 is a multi-homed network connected to an external network 90 through a plurality of connection points. A reference numeral 91 in the drawing indicates an external host establishing communication with the internal host 4 through the external network 90. A DNS server 92 includes a DNS record 93 serving as a correspondence table between the domain name and the external address of the internal host 4, and is able to provide the external address of the internal host 4 in response to an inquiry from the external host 91. An example of the external network 90 is the Internet.

Hereinafter, the external host 91 and the internal host 4 will be also expressed as "an external communication device" and "an internal communication device", respectively.

The first address translation device 3*a* to the third address translation device 3*c* individually translate the addresses of packets transiting through individual connection points, in connection points different from one another. In the attached drawings, the first address translation device, the second address translation device, and the third address translation device are expressed as "NAT1.", "NAT2", and "NAT3", respectively. In addition, in the following description, the first address translation device 3*a* to the third address translation device 3*c* will be also collectively expressed as "address translation devices 3".

The host management server 5 includes an internal host management table 6 serving as a correspondence table that stores information on a correspondence relationship between internal hosts 4 and the address translation devices 3 used for address translation of transmitted packets of the internal hosts 4.

Figures 2, 3:
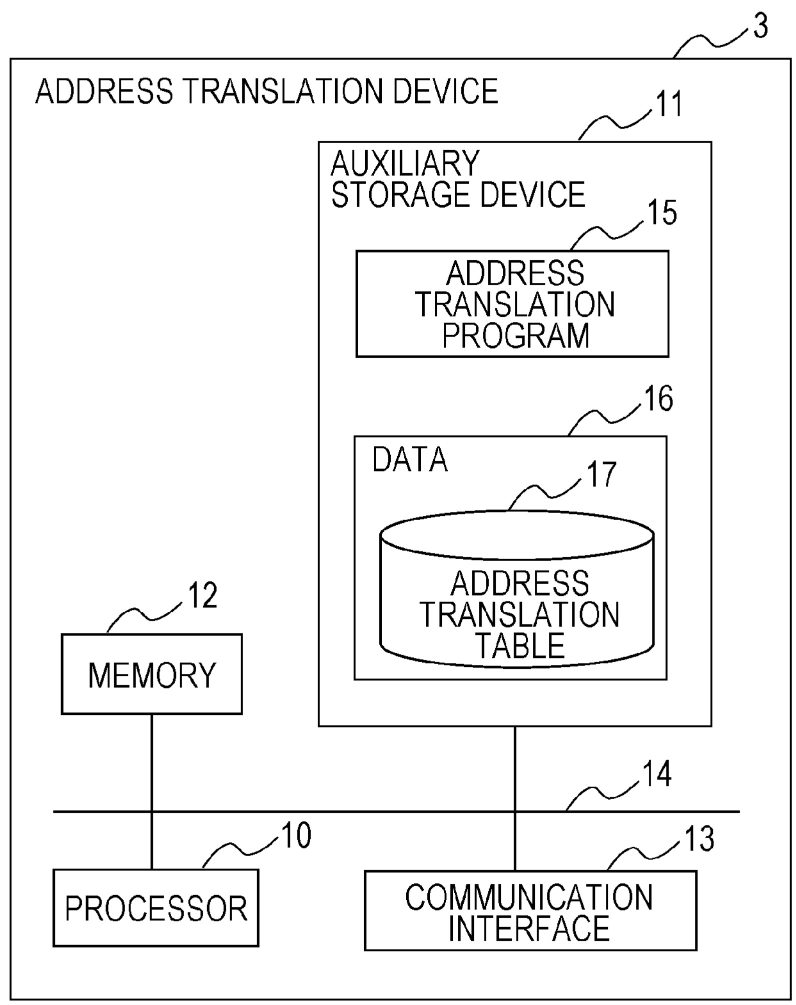
FIG. 2 is a diagram illustrating an example of an internal host management table, according to an embodiment.
FIG. 3 is a diagram illustrating an example of a hardware configuration of an address translation device, according to an embodiment.

FIG. 2 is a diagram illustrating an example of an internal host management table, according to an embodiment. The internal host management table 6 includes an information element "internal host" and an information element "address translation device". The information element "internal host" indicates an identifier identifying each internal host 4 within the internal network 2. The information element "address translation device" indicates address information for the address translation device 3 performing address translation for a transmitted packet of each internal host 4. The illustrated example indicates that the first address translation device 3*a* is used for address translation for a transmitted packet of the first host 4*a* and the second address translation device 3*b* is used for address translation for a transmitted packet of the second host 4*b*.

Processing will be described that is performed in the host management server 5 when the transit connection point of the internal host 4 is changed. The transit connection point may be changed, for example, when the internal host 4 operating as a virtual machine on a physical computer within the internal network 2 is moved so as to operate on another physical computer within the internal network 2. In addition, the transit connection point may be changed, for example, when, within the internal network 2, the position of the internal host 4 on a network topology changes in association with the physical movement of the internal host 4. In the following description, a state in which the transit connection point of the internal host 4 is changed will be also expressed as "the internal host 4 is moved". In addition, the transit connection point may also be changed, for example, when the default gateway of the internal host 4 is simply changed.

When the internal host 4 is moved, an address translation device that performs address translation for a transmitted packet of the internal host 4 after movement will be also expressed as a "post-change address translation device" in the following description. In addition, an address translation device that performs address translation for a transmitted packet of the internal host 4 before the movement will be also expressed as a "pre-change address translation device".

When the internal host 4 is moved, the host management server 5 updates the external address that has been assigned to the moved internal host 4 and registered in the DNS record 93, to an external address to be translated by the post-change address translation device 3. In addition, the host management server 5 updates the default gateway of the moved internal host 4 to the post-change address translation device 3.

In the following description, it is assumed that the internal addresses of the first internal host 4*a* and the second internal host 4*b* are "A" and "B", respectively. In addition, the first address translation device 3*a* assigns an external address "a1" to the first internal host 4*a*, and the second address translation device 3*b* assigns an external address "b2" to the second internal host 4*b*. In addition, the external address of the external host 91 is "c".

<2. Hardware Configuration of Address Translation Device>

Next, a configuration of the address translation device 3 will be described.

FIG. 3 is a diagram illustrating an example of a hardware configuration of an address translation device, according to an embodiment. The address translation device 3 includes a processor 10, an auxiliary storage device 11, a memory 12, and a communication interface 13. These configuration elements 10 to 13 are electrically connected to one another via a bus 14. In addition, the hardware configuration illustrated in FIG. 3 is just one example of a configuration for realizing the address translation device 3. Any hardware configuration may be adopted that allows processing described in the following description to be performed.

An address translation program 15 and data 16 are stored in the auxiliary storage device 11. The auxiliary storage device 11 may include a storage element such as a nonvolatile memory, a hard disk, or a read only memory (ROM). By executing the address translation program 15 stored in the auxiliary storage device 11, the processor 10 executes processing relating to address translation for a packet, which will be described later. In addition, for example, as the data 16, an address translation table 17 used for address translation in the address translation device 3 may be stored in the auxiliary storage device 11.

In the memory 12, a running program executed by the processor 10 and data to be temporarily used by this program may be stored. The memory 12 may include a random access memory (RAM). The communication interface 13 performs processing for transmitting or receiving a packet between the internal network 2 and the external network 90.

The address translation device 3 may include a removable medium reading unit (not depicted in FIG. 3) used for reading data stored in a computer-readable portable recording medium. The removable medium reading unit may be an access device, for example, for a CD-ROM drive device, a DVD-ROM drive device, a flexible disk drive device, a CD-R drive device, a DVD-R drive device, an MO drive device, or a flash memory device. In an embodiment, the address translation program 15 may be distributed with being stored in a computer-readable portable recording medium, and may be installed from the removable medium reading unit to the auxiliary storage device 11. In another embodiment, the address translation program 15 may also be read into the address translation device 3 through the communication interface 13 and installed to the auxiliary storage device 11.

<3. First Embodiment of Address Translation Device>

FIG. 4 is a diagram illustrating a configuration example of an address translation device, according to a first embodiment. The address translation device 3 may be configured to include transmission and reception units 21 and 24, an external packet identification unit 22, an external address translation unit 23, an internal packet identification unit 25, and an internal address translation unit 26. In addition, the address translation device 3 may include an identifier designation unit 27, a NAT information extraction unit 28, and a NAT information addition unit 29.

In accordance with the address translation program 15 stored in the auxiliary storage device 11, the processor 10 in FIG. 3 preferably performs a cooperative operation with another hardware element in the address translation device 3 on an as-needed basis, and hence performs information processing due to each configuration element illustrated in FIG. 4. For example, the processor 10 executes information processing due to the external packet identification unit 22, the external address translation unit 23, the internal packet identification unit 25, the internal address translation unit 26, the identifier designation unit 27, the NAT information extraction unit 28, and the NAT information addition unit 29. In addition, signal processing due to the transmission and reception units 21 and 24 may be executed by the communication interface 13.

The transmission and reception unit 21 performs processing for receiving a packet from the external network 90 and processing for transmitting a packet to the external network 90. The external packet identification unit 22 identifies the type of a received packet from the external network 90. The external packet identification unit 22 outputs a data packet received from the external network 90, to the identifier designation unit 27.

The packet that has transited through the identifier designation unit 27 is inputted to the external address translation unit 23. In accordance with the address translation table 17, the external address translation unit 23 translates the external address of the inputted packet into an internal address.

FIG. 5 is a diagram illustrating an example of an address translation table, according to a first embodiment.

An address translation table 17 includes, as information elements, "the internal address of an internal host", "the external address of the internal host", and "the external address of an external host". The information element "the internal address of the internal host" indicates the internal address of the internal host 4, and the information element "the external address of the internal host" indicates an external address assigned to the internal host 4 by the address translation device 3. The information element "the external address of the external host" is the external address of an external host serving as the transmission source of a packet transmitted to the internal host 4 through the address translation device 3.

The illustrated example indicates that the address translation device has assigned the external address "a1" to the first internal host 4*a* having the internal address "A" and has routed, through the address translation device, a packet whose transmission source is the external host 91 having the external address "c" and whose destination is the first internal host 4*a*.

The external address translation unit 23 searches the address translation table 17 for an entry matching the combination of the transmission source address and the transmission destination address that have been set to a packet using external addresses. The external address translation unit 23 translates the external address of the internal host 4, which serves as the transmission destination address of the packet, into the internal address of the internal host that is being stored in the matched entry of the address translation table 17. The external address translation unit 23 outputs, to the transmission and reception unit 24, the packet whose address has been translated.

The transmission and reception unit 24 performs processing for receiving a packet from the internal network 2 and processing for transmitting a packet to the internal network 2. The packet whose address has been translated by the external address translation unit 23 is transmitted to the internal network 2 by the transmission and reception unit 24. The internal packet identification unit 25 identifies the type of a packet received from the internal network 2. The internal packet identification unit 25 outputs the packet received from the internal network 2 to the internal address translation unit 26.

In addition, when the received packet is a packet conveying movement information and extracted NAT information which will be described later, the internal packet identification unit 25 outputs the movement information and the extracted NAT information to the NAT information extraction unit 28 and the NAT information addition unit 29, respectively. Further, movement information and extracted NAT information may also be transmitted to the address translation device 3 through the external network 90. In this case, the external packet identification unit 22 may identify a packet conveying the movement information and the extracted NAT information and output the movement information and the extracted NAT information to the NAT information extraction unit 28 and the NAT information addition unit 29, respectively.

In accordance with the address translation table 17, the internal address translation unit 26 translates the internal address of an inputted packet to an external address. The internal address translation unit 26 searches the address translation table 17 for an entry matching the combination of the internal address of the internal host 4, which serves as the transmission source address of a packet, and the external address of the external host 91, which serves as the transmission destination address thereof. The internal address translation unit 26 translates the internal address of the internal host 4, which is designated as the transmission source address of the packet, into the external address of the internal host that is being stored in the matched entry of the address translation table 17. The internal address translation unit 26 outputs, to the transmission and reception unit 21, the packet whose address has been translated. The packet whose address has been translated by the internal address translation unit 26 is transmitted to the external network 90 by the transmission and reception unit 21.

The identifier designation unit 27, upon receiving a packet from the external network 90, determines whether or not an entry corresponding to the transmission source address and the transmission destination address of the received packet exists in the address translation table 17. When the corresponding entry does not exist in the address translation table 17, the identifier designation unit 27 creates a new entry storing therein the external address and the internal address of the internal host 4 serving as a transmission destination and the external address of the external host 91, and adds the created new entry to the address translation table 17.

The external address of the external host 91, which is stored in the new entry, corresponds to the information element "the external address of an external host" in the address translation table 17. As described above, the information element "the external address of an external host" indicates the transmission source address of a packet having transited through the address translation device 3. Therefore, the external address of the external host 91, which is stored as the information element "the external address of the external host", is used as an identifier identifying a state in which a packet from the external host 91 has transited through the address translation device 3.

The NAT information extraction unit 28, upon receiving movement information, creates extracted NAT information. Here, the movement information is information identifying an internal host 4 that has moved after transmitting a packet whose address translation being performed by the address translation device 3.

FIG. 6 is a diagram illustrating an example of movement information, according to a first embodiment. The movement information includes an identifier identifying the internal host 4 to move, the internal address of the internal host 4 to move, and the address of the post-change address translation device 3.

The NAT information extraction unit 28 extracts, from the address translation table 17, entries including the address of the internal host 4 that is specified by the movement information, and creates the extracted NAT information storing therein the extracted entries.

FIG. 7 is a diagram illustrating an example of extracted NAT information, according to a first embodiment. The extracted NAT information includes the internal address of the internal host, the external address of the internal host, and the external address of the external host, which are the same information elements as those stored in an entry in the address translation table 17. The extracted NAT information in the illustrated example includes "A", "a1", and "c", as the internal address of the internal host, the external address of the internal host, and the external address of the external host, respectively.

The NAT information extraction unit 28 generates a packet used for transmitting the extracted NAT information to the post-change address translation device 3 specified by the movement information, and outputs the created packet to the transmission and reception unit 24. The transmission and reception unit 24 transmits the extracted NAT information to the post-change address translation device 3 through the internal network 2. Further, the extracted NAT information may be transmitted through the external network 90. In this case, the NAT information extraction unit 28 outputs, to the transmission and reception unit 21, the packet storing therein the extracted NAT information.

Upon receiving extracted NAT information from another address translation device 3, the NAT information addition unit 29 adds, to the address translation table 17, the entry included in the received extracted NAT information. As a result, when the internal host 4 has moved, the same entry as an entry that is stored in the address translation table 17 in the pre-change address translation device 3 and includes the address of the internal host 4 is added to the address translation table 17 in the post-change address translation device 3.

Consequently, when a packet transmitted by the internal host 4 that has moved reaches the post-change address translation device 3 and the internal address translation unit 26 translates the transmission source address of the packet, the transmission source address is translated into the external address assigned by the pre-change address translation device 3. The reason thereof will be described hereinafter.

Now, it is assumed that the first internal host 4*a* has moved, and hence an address translation device that is to perform address translation for a packet transmitted from the first internal host 4*a* changes from the first address translation device 3*a* to the second address translation device 3*b*.

Figure 8:
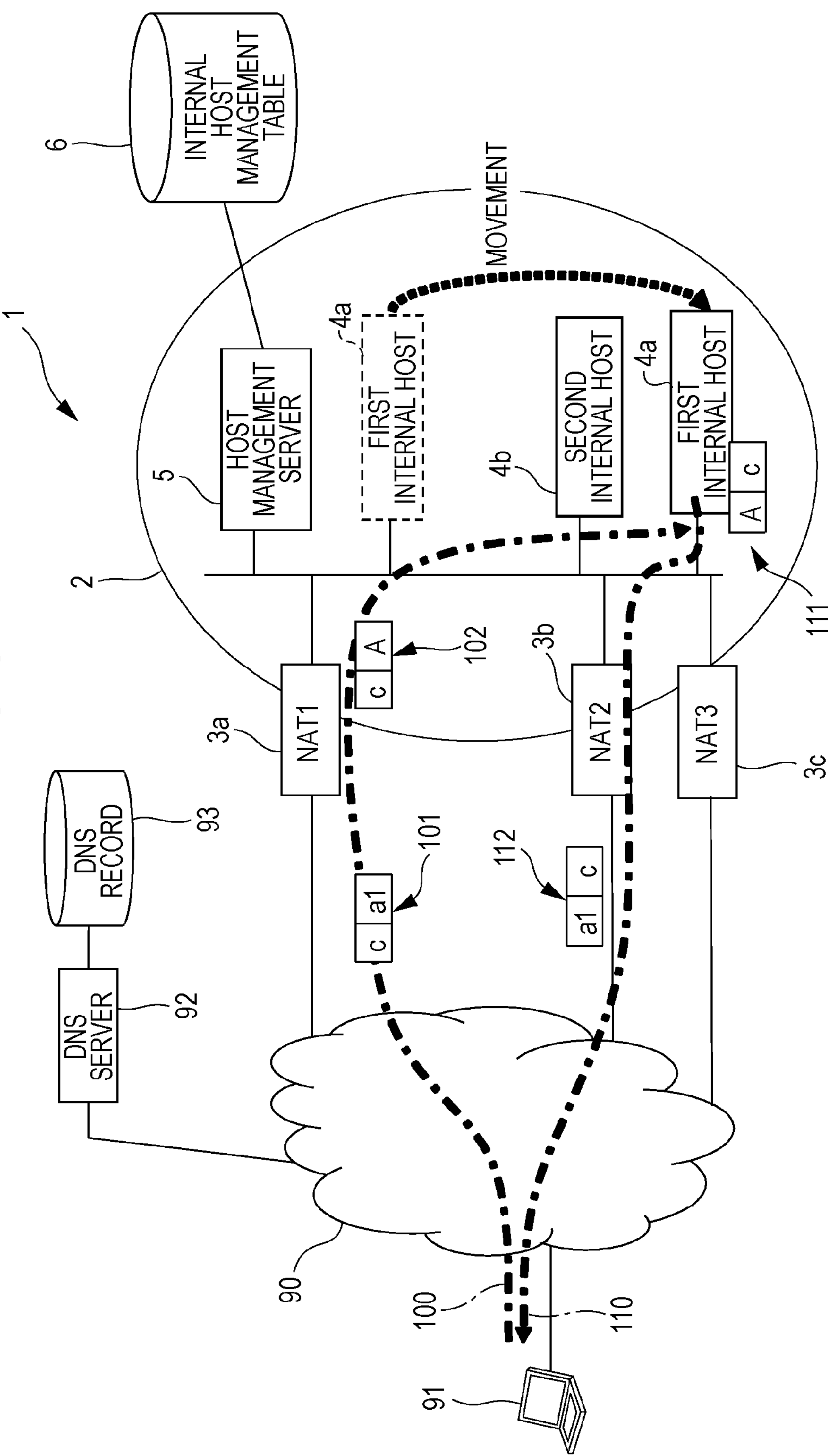
FIG. 8 is a schematic diagram illustrating an example of a packet flow when an internal host has moved, according to a first embodiment.

FIG. 8 is a schematic diagram illustrating an example of a packet flow when an internal host has moved, according to a first embodiment. FIG. 8 illustrates an example where a movement of the first internal host 4*a* has occurred. In the case, the first address translation device 3*a* corresponds to the pre-change address translation device, and the second address translation device 3*b* corresponds to the post-change address translation device.

A communication path through which a packet is transferred from the external host 91 to the first internal host 4*a* is indicated by a reference numeral 100. As illustrated by an arrow 101, the external host 91 transmits a packet having the transmission destination address "a1" and the transmission source address "c". The transmission destination address "a1" is an external address assigned to the first internal host 4*a* by the first address translation device 3*a*, and the transmission source address "c" is the external address of the external host 91.

Firstly, the first address translation device 3*a* receives a packet having the transmission destination address "a1" and the transmission source address "c" before the first internal host 4*a* moves. In this case, the identifier designation unit 27 in the first address translation device 3*a* adds, to the address translation table 17, a new entry including the internal address "A" and the external address "a1" of the first internal host 4*a* and the external address "c" of the external host 91.

FIG. 9A is a diagram illustrating an example of an address translation table, according to a first embodiment. FIG. 9A illustrates an example where the above mentioned new entry is added to the address translation table 17 of the first address translation device 3*a*.

In addition, before the first internal host 4*a* moves, the second address translation device 3*b* has received, from another external host having an external address "x", a packet addressed to the second internal host 4*b*. As a result, in the address translation table 17 of the second address translation device 3*b*, an entry exists that includes the internal address "B" and the external address "b2" of the second internal host 4*b* and the external address "x" of the external host.

FIG. 9B is a diagram illustrating an example of an address translation table, according to a first embodiment. FIG. 9B illustrates an example where the above mentioned entry is stored in the address translation table 17 in the second address translation device 3*b* before the first internal host 4*a* moves.

Next, the first internal host 4*a* moves, and hence the first address translation device 3*a* receives movement information including information on the first internal host 4*a* that has moved. In an embodiment, the movement information may be transmitted to the first address translation device 3*a* by the host management server 5.

For example, the host management server 5 performs the following operations (1) to (5) when the first internal host 4*a* moves.

(1) The host management server 5 updates the content of an information element "address translation device" of the entry that is stored in the internal host management table 6 in association with the first internal host 4*a*.

(2) The host management server 5 transmits, to the first internal host 4*a*, a movement instruction for causing the first internal host 4*a* to perform processing for movement thereof.

(3) The host management server 5 instructs the first internal host 4*a* to change a default gateway from the first address translation device 3*a* to the second address translation device 3*b*.

(4) The host management server 5 transmits, to the DNS server 92, an address change instruction for updating the DNS record 93 of the first internal host 4*a*.

(5) The host management server 5 transmits movement information to the first address translation device 3*a*.

The NAT information extraction unit 28 of the first address translation device 3*a* creates extracted NAT information storing therein an entry including the internal address "A" and the external address "a1" of the first internal host 4*a* and the external address "c" of the external host 91. The first address translation device 3*a* transmits the created extracted NAT information to the second address translation device 3*b*. Upon receiving the extracted NAT information, the NAT information addition unit 29 of the second address translation device 3*b* adds, to the address translation table 17, the same entry as an entry stored in the received extracted NAT information.

FIG. 9C is a diagram illustrating an example of an address translation table, according to a first embodiment. FIG. 9C illustrates an example where the entry of the first internal host 4*a* is added to the address translation table 17 of the second address translation device 3*b*.

Figure 10:
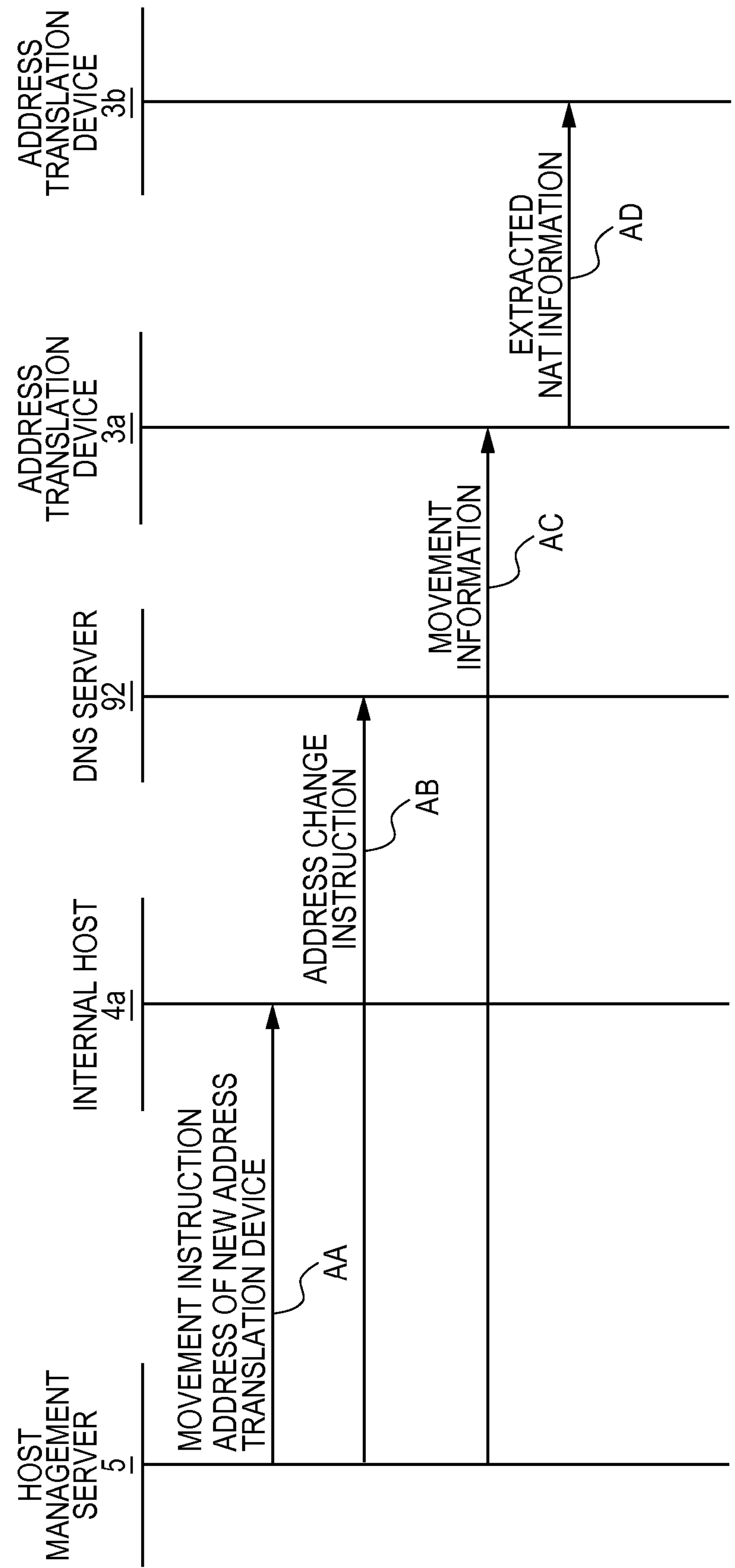
FIG. 10 is a diagram illustrating an example of a sequence of communication operations, according to a first embodiment.

FIG. 10 is a diagram illustrating an example of a sequence of communication operations, according to a first embodiment. FIG. 10 illustrates operations in association with the transmission timings of pieces of information including the movement instruction, the address of the address translation device, the address change instruction, the movement information, and the extracted NAT information, which have been described above.

In operation AA, when the first internal host 4*a* has moved, the host management server 5 transmits, to the first internal host 4*a*, the movement instruction and the address of the second address translation device 3*b* serving as the post-change address translation device.

In operation AB, the host management server 5 transmits an address change instruction to the DNS server 92.

In operation AC, the host management server 5 transmits the movement information to the first address translation device 3*a* serving as the pre-change address translation device.

In operation AD, the first address translation device 3*a* transmits the extracted NAT information to the second address translation device 3*b*.

Here, FIG. 8 is referred to. When the external host 91 is not yet notified of the update of the DNS record 93 due to the movement of the first internal host 4*a*, the external host 91 transmits a packet having the transmission destination address "a1" in the similar way as a packet designated by the arrow 101 in FIG. 8. The packet having the transmission destination address "a1" reaches the first address translation device 3*a*, and the transmission destination address "a1" is translated into the internal address "A" by the first address translation device 3*a* as indicated by an arrow 102. After that, this packet is transmitted within the internal network 2 and reaches the first internal host 4*a*.

A reference numeral 110 indicates a transmission path through which a response packet is sent back to the external host 91 from the first internal host 4*a* after movement, in the same sequence of communication operations in which the packet designated by the arrow 101 has been transmitted. Here, the first internal host 4*a* creates a response packet by swapping the transmission source address "c" and the transmission destination address "A" of the received packet designated by the arrow 102, and sends back the created response packet to the external host 91. An arrow 111 indicates the created response packet.

The response packet transmitted by the first internal host 4*a* reaches the second address translation device 3*b*. In accordance with the address translation table 17, the internal address translation unit 26 of the second address translation device 3*b* translates the internal address of the inputted response packet into an external address. As illustrated in FIG. 9C, in the address translation table 17, an entry exists that matches the combination of the internal address "A" of the first internal host 4*a* serving as the transmission source address of the response packet and the external address "c" of the external host 91 serving as the transmission destination address of the response packet.

Therefore, the internal address translation unit 26 translates the transmission source address "A" of the response packet into the external address "a1" of the first internal host 4*a* that is being stored in the matched entry. A packet after translation has the transmission destination address "c" and the transmission source address "a1" both of which serve as external addresses, as illustrated by an arrow 112 in FIG. 8. In such a way as described above, the transmission source address of the received response packet is translated, by the second address translation device 3*b*, into the external address "a1" that has been assigned to the first internal host 4*a* by the first address translation device 3*a*.

The transmission source address "a1" of the response packet received by the external host 91 (as designated by the arrow 112) matches the transmission destination address "a1" of the packet transmitted by the external host 91 (as designated by the arrow 101). As a result, the external host 91 is able to identify the transmitted packet and the response packet as packets transmitted and received in the same sequence of communication operations, it is possible to continue communication.

The above-mentioned processing of the address translation device will be described using a flowchart.

Figure 11:
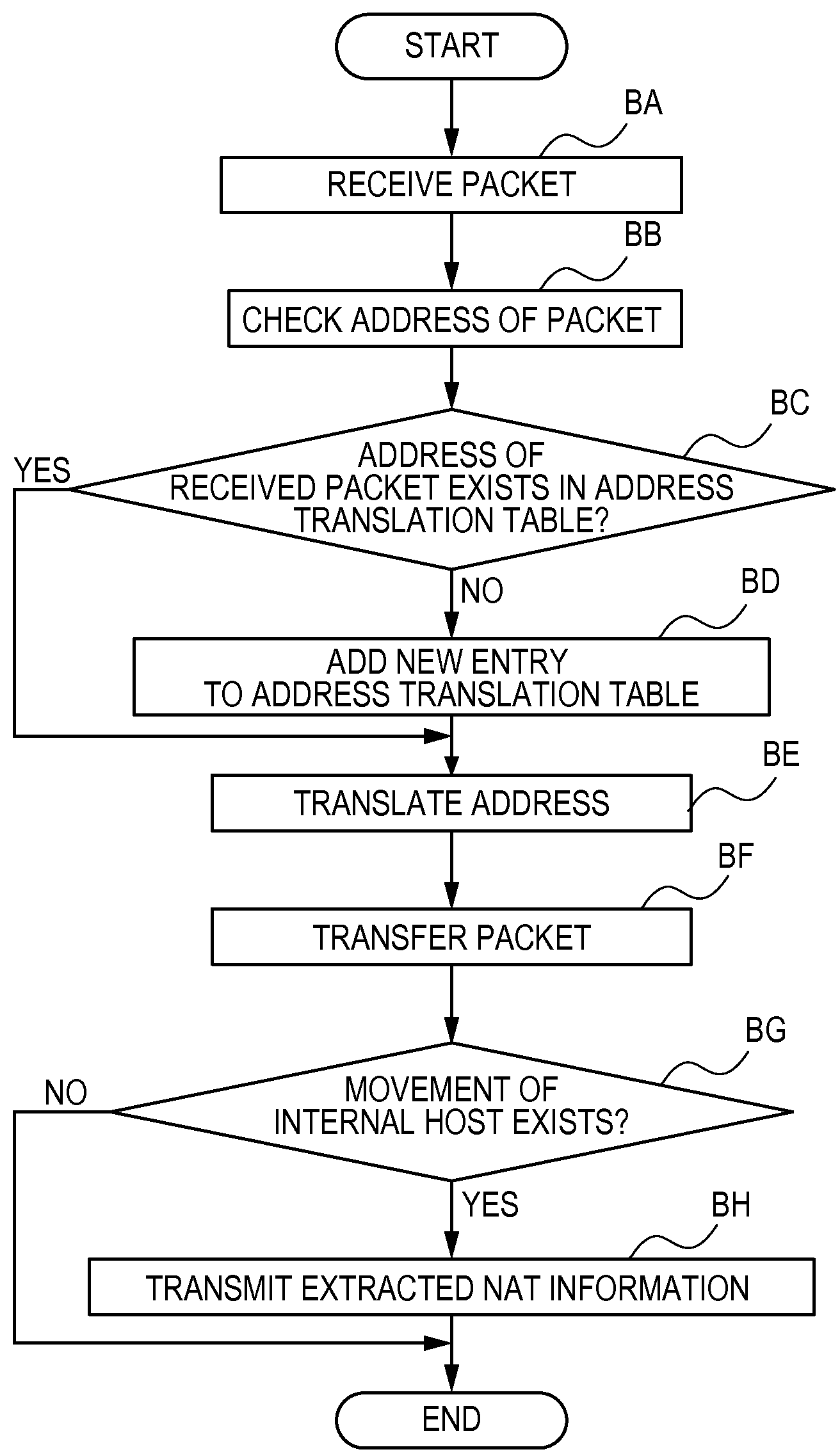
FIG. 11 is a diagram illustrating an example of an operational flowchart for a first address translation device, according to a first embodiment.

FIG. 11 is a diagram illustrating an example of an operational flowchart for a first address translation device, according to a first embodiment. FIG. 11 illustrates an example of processing performed by the first address translation device 3*a* when the first address translation device 3*a* operates as the pre-change address translation device.

In operation BA, the first address translation device 3*a* receives a packet from the external network 90.

In operation BB, the first address translation device 3*a* checks the address of the received packet.

In operation BC, the first address translation device 3*a* determines whether or not, in the address translation table 17, an entry exists that corresponds to the transmission source address and the transmission destination address of the received packet. When, in the address translation table 17, the entry exits that corresponds to the addresses of the received packet (YES in operation BC), the processing proceeds to operation BE. When, in the address translation table 17, the entry does not exit that corresponds to the addresses of the received packet (NO in operation BC), the processing proceeds to operation BD.

In operation BD, the identifier designation unit 27 of the first address translation device 3*a* adds, to the address translation table 17, a new entry storing therein the external address and the internal address of the internal host 4 serving as a transmission destination and the external address of the external host 91. After that, the processing proceeds to operation BE.

In operation BE, in accordance with the address translation table 17, the external address translation unit 23 of the first address translation device 3*a* translates, into an internal address, the external address used as the transmission destination address of the received packet.

In operation BF, the transmission and reception unit 24 of the first address translation device 3*a* transfers the packet to the internal network 2.

In operation BG, the NAT information extraction unit 28 of the first address translation device 3*a* determines whether or not the movement of the internal host 4 exists that is to be subjected to address translation by the first address translation device 3*a*. The NAT information extraction unit 28 may be configured to determine whether or not the movement of the internal host 4 exists by determining whether or not movement information is received. When the movement of the internal host 4 exists (YES in operation BG), the processing proceeds to operation BH. When the movement of the internal host 4 does not exist (NO in operation BG), the processing is terminated.

In operation BH, the NAT information extraction unit 28 extracts an entry including the address of the internal host 4 to move, from the address translation table 17, and transmits, to the post-change address translation device, the extracted NAT information storing therein the extracted entry. After that, the processing is terminated.

Figure 12:
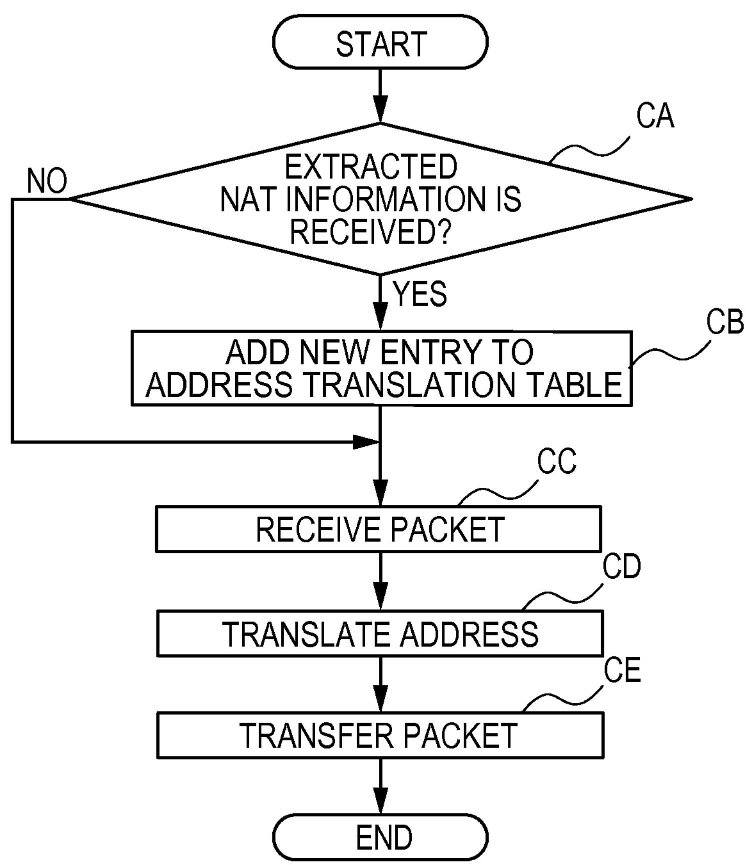
FIG. 12 is a diagram illustrating an example of an operational flowchart for a second address translation device, according to a first embodiment.

FIG. 12 is a diagram illustrating an example of an operational flowchart for a second address translation device, according to a first embodiment. FIG. 12 illustrates processing performed in the second address translation device 3*b* when the second address translation device 3*b* operates as the post-change address translation device.

In operation CA, the NAT information addition unit 29 of the second address translation device 3*b* determines whether or not extracted NAT information has been received from another address translation device 3. When the extracted NAT information has been received (YES in operation CA), the processing proceeds to operation CB, and otherwise (NO in operation CA), the processing proceeds to operation CC.

In operation CB, the NAT information addition unit 29 adds, to the address translation table 17, the same entry as an entry included in the received extracted NAT information. After that, the processing proceeds to operation CC.

In operation CC, the second address translation device 3*b* receives a packet from the internal network 2.

In operation CD, in accordance with the address translation table 17, the internal address translation unit 26 translates, to an external address, the internal address of the received packet. When the entry of the first internal host 4*a* that was created by the first address translation device 3*a* has been added, in operation CB, to the address translation table 17 based on the received extracted NAT information, the transmission source address of the received packet from the first internal host 4*a* is translated into an external address assigned by the first address translation device 3*a*.

In operation CE, the transmission and reception unit 21 transfers the packet to the external network 90. After that, the processing is terminated.

As mentioned above, when the internal host 4 moves, a case occurs where a packet transmitted from the external host 91 to the internal host 4 and a packet transmitted from the internal host 4 to the external host 91 transit through the different address translation devices 3. According to the embodiment, in such a case, it is possible to match the external addresses of the internal hosts 4 that are specified by a packet transmitted from the external host 91 to the internal host 4 and by a response packet transmitted from the internal host 4 to the external host 91, with each other. As a result, the external host 91 becomes able to identify the transmitted packet and the response packet as packets transmitted and received in the same sequence of communication operations, thereby allowing the external host 91 to continue communication.

<4. Second Embodiment of Address Translation Device>

Next, another embodiment of the address translation device 3 will be described. In the embodiment, as an identifier for identifying a state in which a packet from the external host 91 has transited through the address translation device 3, an internal address that is assigned to the external host 91 by the address translation device 3 is used.

FIG. 13 is a diagram illustrating an example of an address translation table, according to a second embodiment. The address translation table 17 includes, as information elements, "the internal address of an internal host", "the external address of the internal host", "the internal address of an external host", and "the external address of the external host".

The information elements "the internal address of the internal host", "the external address of the internal host", and "the internal address of the external host" are the same as those in the address translation table 17 illustrated in FIG. 5. The information element "the internal address of the external host" is an internal address that is assigned to the external host 91 by the address translation device 3. The illustrated example indicates that the address translation device 3 has assigned the external address "a1" to the first internal host 4*a* having the internal address "A" and routes, through the address translation device 3, a packet whose transmission source is the external host 91 having the external address "c" and whose destination is the first internal host 4*a*. Furthermore, the illustrated example indicates that the address translation device 3 has assigned an internal address "PA12" to the external host 91.

When there exist no entries, in the address translation table 17, that correspond to the addresses of a received packet, the identifier designation unit 27 acquires an unused internal address from the pool address table, and assigns the acquired internal address to the external host 91. The pool address table indicates the list of addresses that are allocated to the address translation device 3 as internal addresses that are allowed to be assigned to the external host 91 by the address translation device 3. The internal addresses stored in the pool address tables of the individual address translation devices 3*a* to 3*c* are specified so as not to overlap with each other. The pool address table may be stored in the auxiliary storage device 11, as the data 16 illustrated in FIG. 3.

FIG. 14 is a diagram illustrating an example of a pool address table, according to a second embodiment. The pool address table includes information elements "address" and "usage flag". The information element "address" indicates an internal address that is allowed to be assigned to the external host 91 by the address translation device 3. The information element "usage flag" indicates whether or not each internal address has been assigned to the external host 91 by the address translation device 3. The illustrated example indicates that internal addresses "PA11" and "PA12" are allocated to the address translation device 3, as internal addresses allowed to be assigned to the external host 91 by the address translation device 3. In addition, the internal address "PA11" has already been used, and the internal address "PA12" has not been used yet.

The identifier designation unit 27 creates an entry storing therein the external address and the internal address of the internal host 4 serving as a transmission destination, the external address of the external host 91, and the internal address of the external host 91 that has been acquired from the pool address table, and adds the created entry to the address translation table 17.

Figure 15:
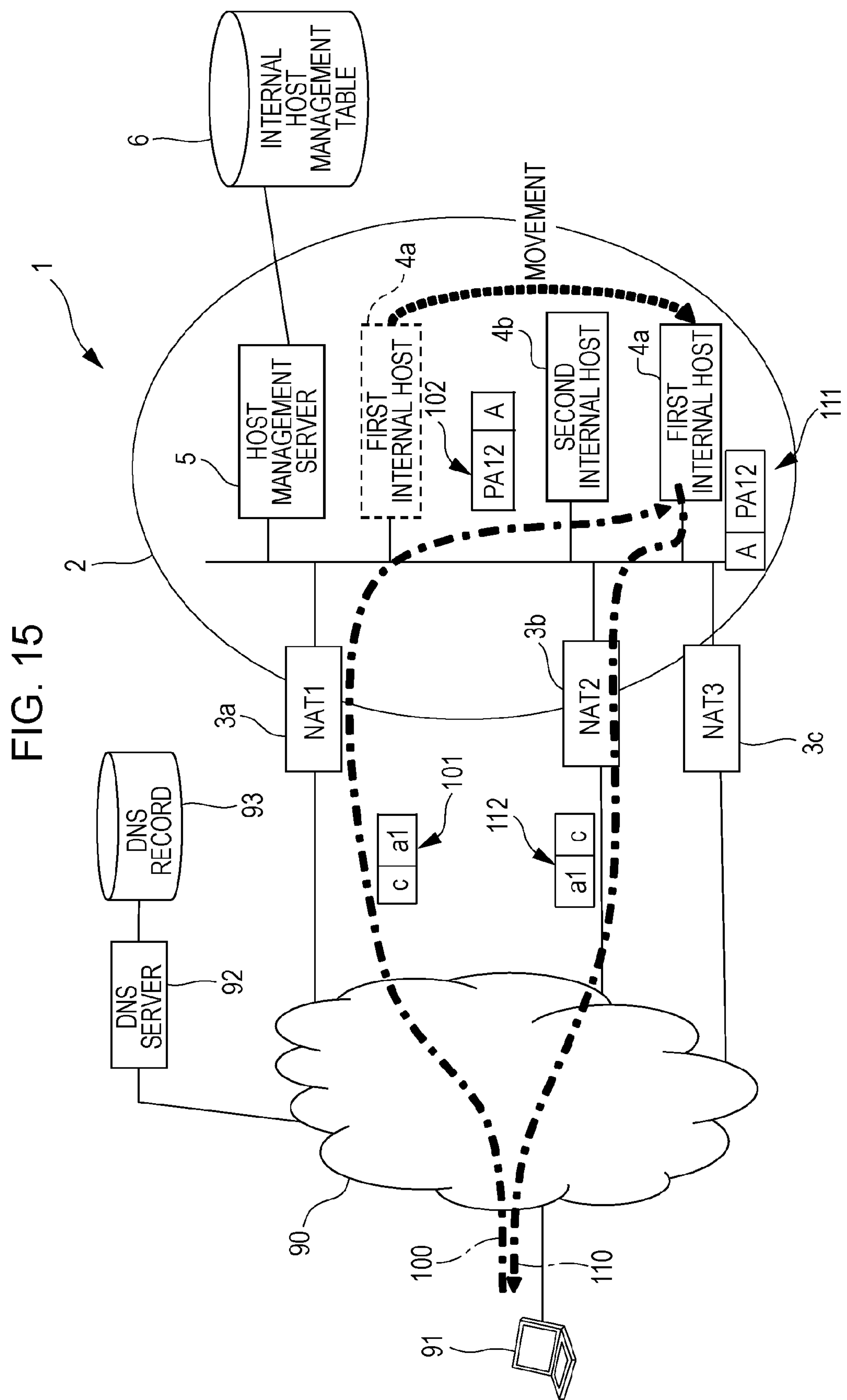
FIG. 15 is a schematic diagram illustrating an example of a packet flow when an internal host moves, according to a second embodiment.

FIG. 15 is a schematic diagram illustrating an example of a packet flow when an internal host moves, according to a second embodiment. FIG. 15 illustrates a packet flow when the first internal host 4*a* has moved. The usage of the reference numeral 100 and the arrow 101 is the same as those in FIG. 8. The first address translation device 3*a* receives, for the first time, a packet having the transmission destination address "a1" and the transmission source address "c" before the first internal host 4*a* moves. In this case, the identifier designation unit 27 of the first address translation device 3*a* acquires, as the internal address for the external host 91, the address "PA12" associated with the information element "usage flag" having value "unused", from the pool address table. The identifier designation unit 27 adds, to the address translation table 17, a new entry including the internal address "A" and the external address "a1" of the first internal host 4*a* and the internal address "PA12" and the external address "c" of the external host 91.

FIG. 16A is a diagram illustrating an example of an address translation table, according to a second embodiment. FIG. 16A illustrates the address translation table 17 of the first address translation device 3*a* to which the above mentioned new entry is added.

In addition, before the movement of the first internal host 4*a*, the second address translation device 3*b* has received, from another external host having an external address "x", a packet addressed to the second internal host 4*b*. Therefore, there exists, in the address translation table 17 of the second address translation device 3*b*, an entry that includes the internal address "B" and the external address "b2" of the second internal host 4*b* and the internal address "PA21" and the external address "x" of the external host.

FIG. 16B is a diagram illustrating an example of an address translation table, according to a second embodiment. FIG.

16B illustrates the address translation table 17 of the second address translation device 3_b_ before the first internal host 4_a_ moves.

When the first internal host 4_a_ moves, the first address translation device 3_a_ receives movement information including information on the first internal host 4_a_ that has moved. The NAT information extraction unit 28 of the first address translation device 3_a_ creates extracted NAT information storing therein an entry that stores the internal address "A" and the external address "a1" of the first internal host 4_a_ and the internal address "PA12" and the external address "c" of the external host 91.

FIG. 17 is a diagram illustrating an example of extracted NAT information, according to a second embodiment. The first address translation device 3_a_ transmits the extracted NAT information to the second address translation device 3_b_.

Upon receiving the extracted NAT information, the NAT information addition unit 29 of the second address translation device 3_b_ adds, to the address translation table 17, the same entry as an entry stored in the received extracted NAT information.

FIG. 16C is a diagram illustrating an example of an address translation table, according to a second embodiment. FIG. 16C illustrates the address translation table 17 of the second address translation device 3_b_ to which the above mentioned entry is added.

When the external host 91 transmits a packet having the transmission destination address "a1" in the same way as the packet designated by the arrow 101 in FIG. 15, this packet reaches the first address translation device 3_a_. In accordance with the address translation table 17, the external address translation unit 23 translates, into internal addresses, the external addresses of the first internal host 4_a_ and the external host 91 stored in the received packet. As a result, the transmission destination address "a1" and the transmission source address "c" in the received packet are translated into the internal addresses "A" and "PA12", respectively. The packet after translation is indicated by an arrow 102 in FIG. 15. This packet is transmitted within the internal network 2 and reaches the first internal host 4_a_.

A reference numeral 110 indicates a transmission path through which a response packet is sent back from the first internal host 4_a_ after movement, to the external host 91 in the same sequence of communication operations in which the packet indicated by the arrow 101 has been transmitted. The first internal host 4_a_ creates a response packet to be sent back to the external host 91, by swapping the transmission source address "PA12" and the transmission destination address "A" of the received packet designated by the arrow 102. An arrow 111 indicates the created response packet.

The created response packet reaches the second address translation device 3_b_. In accordance with the address translation table 17, the internal address translation unit 26 of the second address translation device 3_b_ translates the internal address of the received response packet into an external address. In the address translation table 17, there exists an entry that matches the combination of the internal address "A" of the first internal host 4_a_ serving as the transmission source address of the response packet and the internal address "PA12" of the external host 91 serving as the transmission destination address of the response packet. Therefore, the internal address translation unit 26 translates the transmission source address "A" and the transmission destination address "PA12" of the response packet into the external addresses "a1" and "c", respectively. The response packet after translation is illustrated by an arrow 112. That is, a transmission source address after translation becomes the external address "a1" that was assigned to the first internal host 4_a_ by the first address translation device 3_a_.

In this way, the transmission source address "a1" of the response packet received by the external host 91 matches the transmission destination address "a1" of the packet transmitted from the external host 91. As a result, the external host 91 becomes able to identify the transmitted packet and the received response packet as packets transmitted and received in the same sequence of communication operations, thereby allowing the external host 91 to continue communication.

Figure 18:
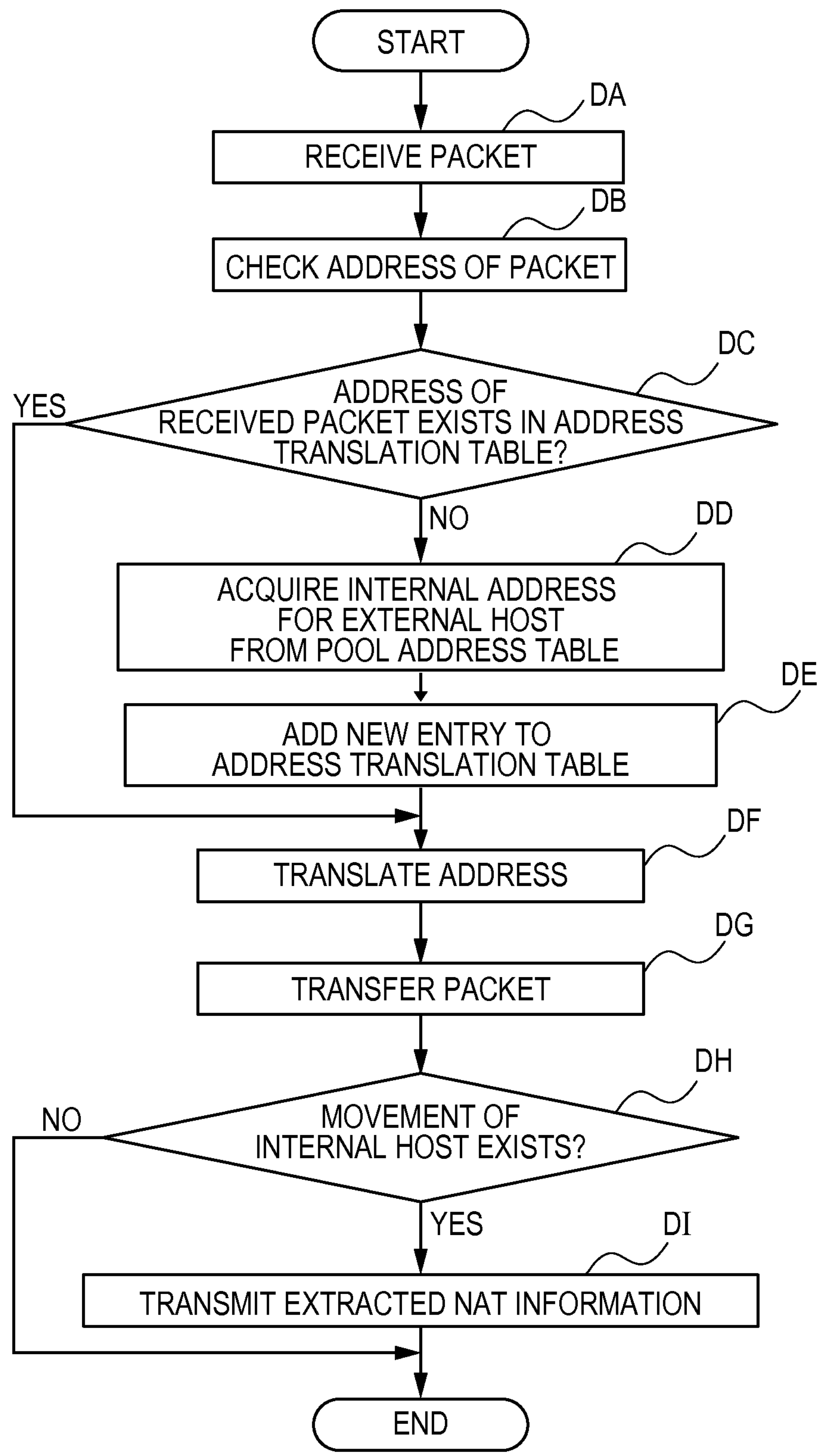
FIG. 18 is a diagram illustrating an example of an operational flowchart performed by a first address translation device, according to a second embodiment.

FIG. 18 is a diagram illustrating an example of an operational flowchart performed by a first address translation device, according to a second embodiment.

Processing for operations DA to DC is the same as the processing for operations BA to BC in FIG. 11.

When there exists, in the address translation table 17, an entry that corresponds to the addresses of a received packet (YES in operation DC), the processing proceeds to operation DF, and otherwise (NO in operation DC), the processing proceeds to operation DD.

In operation DD, the identifier designation unit 27 of the first address translation device acquires an internal address for the external host 91 from the pool address table.

In operation DE, the identifier designation unit 27 adds, to the address translation table 17, a new entry storing therein the external address and the internal address of the internal host 4 serving as a transmission destination and the internal address and the external address of the external host 91. After that, the processing proceeds to operation DF.

Processing for operations DF to DI is the same as the processing for operations BE to BH in FIG. 11.

Figure 19:
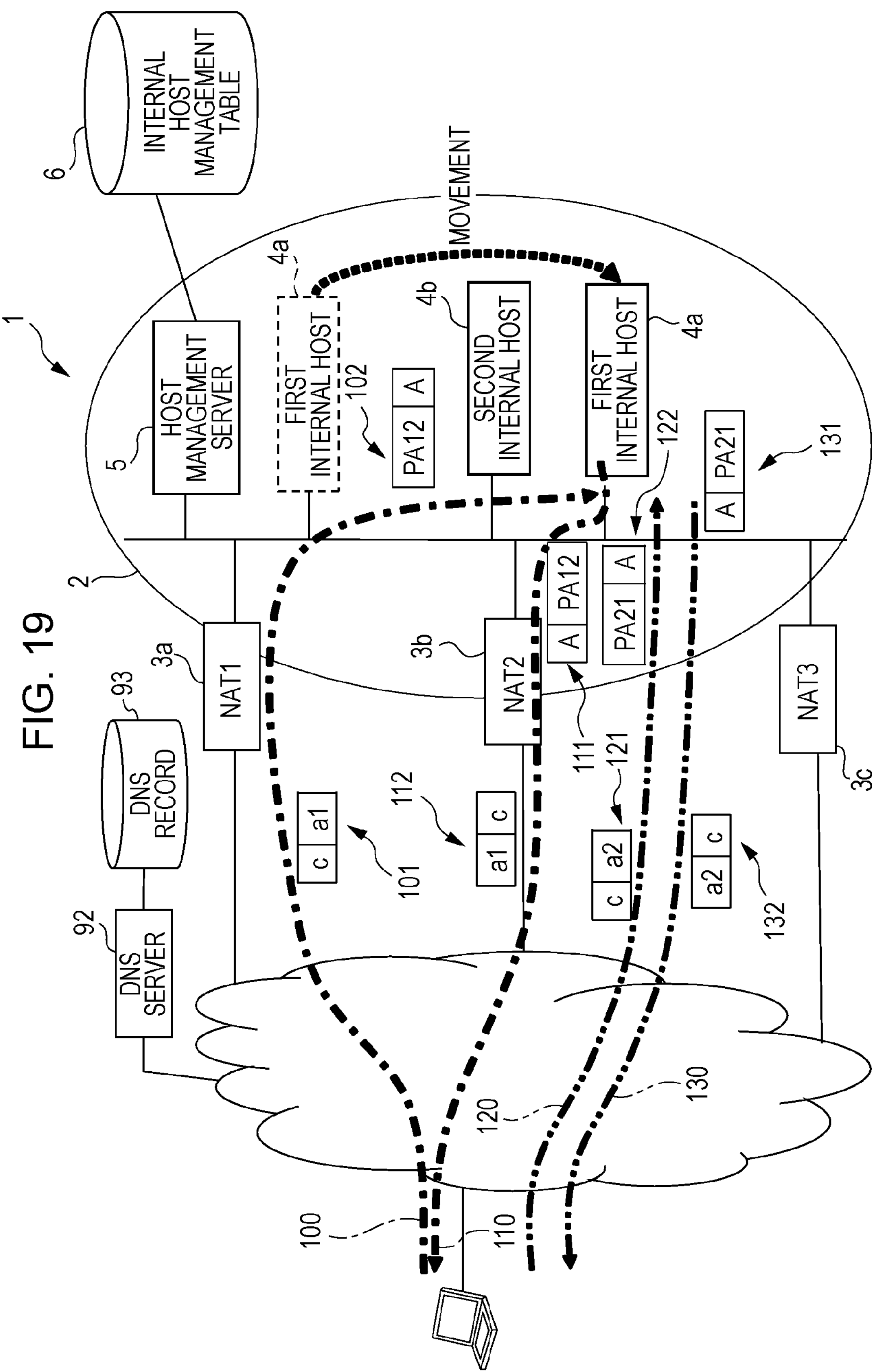
FIG. 19 is a schematic diagram illustrating an example of a packet flow when an internal host moves, according to a second embodiment.

FIG. 19 is a schematic diagram illustrating an example of a packet flow when an internal host moves, according to a second embodiment. FIG. 19 illustrates a packet flow that is performed after the external host 91 has been notified of the DNS record updated owing to the movement of the first internal host 4_a_. The usage of the reference numerals 100 to 102 and 110 to 112 is the same as in FIG. 15.

After the external host 91 has been notified of the DNS record, a packet that is to be transmitted from the external host 91 to the first internal host 4_a_ is transmitted along a communication path indicated by a reference numeral 120. As indicated by an arrow 121, the external host 91 transmits a packet having a transmission destination address "a2" and the transmission source address "c". The transmission destination address "a2" is an external address that was assigned to the first internal host 4_a_ by the second address translation device 3_b_.

When the second address translation device 3_b_ receives the packet having the transmission destination address "a2" and the transmission source address "c", for the first time, the second address translation device 3_b_ assigns an internal address to the external host 91. In this example, an internal address "PA21" is assigned to the external host 91 by the second address translation device 3_b_. The second address translation device 3_b_ translates the transmission destination address and the transmission source address of the received packet into the internal addresses "A" and "PA21", respectively. The packet after translation is indicated by an arrow 122 in FIG. 19.

A reference numeral 130 indicates a transmission path through which the first internal host 4_a_ that has received the packet indicated by the arrow 122 sends back a response packet to the external host 91 of a transmission source. The response packet indicated by an arrow 131 includes the transmission destination address "PA21" and the transmission source address "A".

In the same way as the transmission path indicated by the reference numeral 110, the transmission path indicated by the reference symbol 130 is a transmission path through which the response packet is transmitted to the external network 90 via the second address translation device 3*b*. That is, when a first packet that has transited via the first address translation device 3*a* has been received and when a second packet that has transited via the second address translation device 3*b* has been received, response packets corresponding to these received packets are transmitted to the external network 90 via the second address translation device 3*b*.

The transmission destination address of a first response packet corresponding to the first packet received through the first address translation device 3*a* is the internal address "PA12" assigned by the first address translation device 3*a*, as indicated by the arrow 111. The transmission destination address of a second response packet corresponding to the second packet received through the second address translation device 3*b* is the internal address "PA21" assigned by the second address translation device 3*b* and different from the transmission destination address of the first response packet corresponding to the first packet received through the first address translation device 3*a*. Therefore, it is possible for the second address translation device 3*b* to distinguish the first response packet corresponding to the first packet received through the first address translation device 3*a* from the second response packet corresponding to the second packet received through the second address translation device 3*b*.

As a result, it is possible for the second address translation device 3*b* to translate the transmission source address of the first response packet corresponding to the first packet received through the first address translation device 3*a* into the external address "a1" assigned by the first address translation device 3*a*. In addition, it is possible for the second address translation device 3*b* to translate the transmission source address of the second response packet corresponding to the second packet received through the second address translation device 3*b* into the external address "a2" assigned by the second address translation device 3*b*.

According to the embodiment, even if response packets corresponding to the received packets that have transited through the first address translation device 3*a* and the second address translation device 3*b*, respectively, are mixed with each other after the external host 91 has been notified of the update of the DNS record, it is possible to perform address translation for these response packets by distinguishing these response packets from each other.

<5. Third Embodiment of Address Translation Device>

Next, another embodiment of the address translation device 3 will be described. In this embodiment, as an identifier for identifying a state in which a packet from the external host 91 has transited through the address translation device 3, the external IP address and the external port number of the external host 91 are used. In the following description and attached drawings, the port number will be also expressed simply as a "port" for convenience.

FIG. 20 is a diagram illustrating an example of an address translation table, according to a third embodiment. The address translation table 17 includes, as information elements, "the internal IP address of an internal host", "the external IP address of the internal host", "the external IP address of an external host", and "the external port of the external host". The information elements "the internal IP address of the internal host" and "the external IP address of the internal host" indicate the internal IP address and the external IP address of the internal host 4, respectively.

The information element "the external IP address of the external host" indicates the external IP address of the external host 91 serving as the transmission source of a packet that has been transmitted to the internal host 4 through the address translation device 3. The information element "the external port of the external host" indicates an external port used by an application in the external host 91 that has transmitted the packet. The illustrated example indicates that the address translation device 3 assigns an external IP address "a1" to the first internal host 4*a* having an internal IP address "A". In addition, the illustrated example indicates that the address translation device 3 has received a packet whose destination is the first internal host 4*a*, from an application that utilizes an external port "90" in the external host 91 having an external IP address "c".

When a packet has been received from the external network 90, the identifier designation unit 27 determines whether or not there exists, in the address translation table 17, an entry that corresponds to the transmission source IP address and the transmission source port of this packet and the external IP address of the internal host 4 serving as the transmission destination of this packet. When the corresponding entry does not exist in the address translation table 17, the identifier designation unit 27 creates a new entry storing therein the external IP address and the internal IP address of the internal host 4 serving as a transmission destination and the external IP address and the external port of the external host 91, and adds the created new entry to the address translation table 17.

Figure 21:
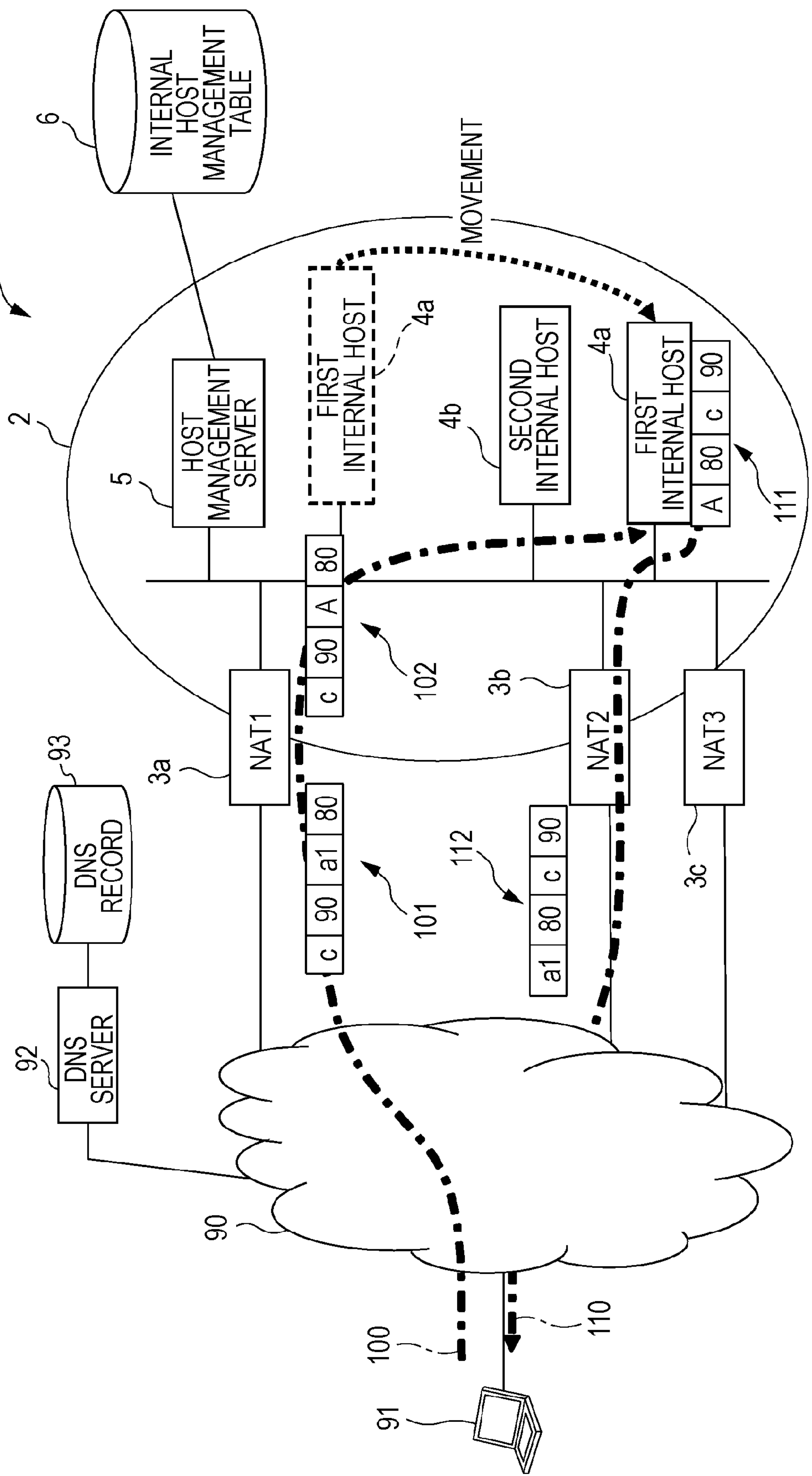
FIG. 21 is a schematic diagram illustrating an example of a packet flow when an internal host moves, according to a third embodiment.

FIG. 21 is a schematic diagram illustrating an example of a packet flow when an internal host moves, according to a third embodiment. Hereinafter, with reference to FIG. 21, processing will be described that is performed in the embodiment when the first internal host 4*a* has moved. The usage of the reference numeral 100 is the same as in FIG. 8. As indicated by an arrow 101, the external host 91 transmits a packet having a transmission destination IP address "a1", a transmission destination port "80", the transmission source IP address "c", and the transmission source IP port "90". The transmission destination IP address "a1" is an external address assigned to the first internal host 4*a* by the first address translation device 3*a*, and the transmission destination port "80" is one of ports of the first internal host 4*a* that is to be the transmission destination of the packet. The transmission source IP address "c" is the external IP address of the external host 91, and the transmission source port "90" is the external port of the external host 91.

The first address translation device 3*a* receives a packet indicated by the arrow 101, for the first time, before the movement of the first internal host 4*a*. The identifier designation unit 27 of the first address translation device 3*a* adds, to the address translation table 17, a new entry storing the internal IP address "A" and the external IP address "a1" of the first internal host 4*a* and the external IP address "c" and the external port "90" of the external host 91.

FIG. 22A is a diagram illustrating an example of an address translation table, according to a third embodiment. FIG. 22A illustrates the address translation table 17 of the first address translation device 3*a* to which the above mentioned new entry has been added.

In addition, before the movement of the first internal host 4*a*, the second address translation device 3*b* has received, from another external host having an external address "x", a packet addressed to the second internal host 4*b*. Therefore, there exists, in the address translation table 17 of the second address translation device 3*b*, an entry that includes the internal IP address "B" and the external IP address "b2" of the second internal host 4*b* and the external IP address "x" and the external port "70" of the external host.

FIG. 22B is a diagram illustrating an example of an address translation table, according to a third embodiment. FIG. 22B illustrates the address translation table 17 of the second address translation device 3*b* before the first internal host 4*a* moves.

The first address translation device 3*a* receives movement information owing to the movement of the first internal host 4*a*. The NAT information extraction unit 28 of the first address translation device 3*a* creates extracted NAT information storing therein an entry that stores the internal IP address "A" and the external IP address "a1" of the first internal host 4*a* and the external IP address "c" and the external port "90" of the external host 91.

FIG. 23 is a diagram illustrating an example of extracted NAT information, according to a third embodiment. The first address translation device 3*a* transmits the created extracted NAT information to the second address translation device 3*b*.

The NAT information addition unit 29 of the second address translation device 3*b* adds, to the address translation table 17, an entry that is the same as an entry stored in the received extracted NAT information.

FIG. 22C is a diagram illustrating an example of an address translation table, according to a third embodiment. FIG. 22C illustrates the address translation table 17 of the second address translation device 3*b* to which the above mentioned entry of the first internal host 4*a* is added.

When the external host 91 transmits a packet having the transmission destination address "a1" in the same way as indicated by the arrow 101 in FIG. 21, this packet reaches the first address translation device 3*a*. In accordance with the address translation table 17, the external address translation unit 23 translates, into an internal address, the external address of the first internal host 4*a* stored in the received packet. As a result, the transmission destination address "a1" stored in the received packet is translated into the internal address "A" as indicated by an arrow 102 in FIG. 21. This packet is transmitted within the internal network 2 and reaches the first internal host 4*a*.

A reference numeral 110 indicates a transmission path through which a response packet is sent back to the external host 91 from the first internal host 4*a* after movement, in the same sequence of communication operations in which the packet indicated by the arrow 101 has been transmitted. The first internal host 4*a* creates a response packet to be sent back to the external host 91, by swapping the transmission source address "c" and the transmission destination address "A" of the received packet of the arrow 102. An arrow 111 indicates the created response packet.

The response packet reaches the second address translation device 3*b*. In accordance with the address translation table 17, the internal address translation unit 26 of the second address translation device 3*b* translates the internal address of the received response packet into an external address. In the address translation table 17, there exists an entry that matches the combination of the internal address "A" of the first internal host 4*a* serving as the transmission source address of the response packet and the external address "c" of the external host 91 serving as the transmission destination address thereof. Therefore, the internal address translation unit 26 translates the transmission source address "A" of the response packet into the external address "a1". The response packet after translation is designated by an arrow 112, and a transmission source address after translation becomes the external address "a1" that was assigned to the first internal host 4*a* by the first address translation device 3*a*.

The transmission source address "a1" of the response packet received by the external host 91 matches the transmission destination address "a1" of the packet transmitted by the external host 91. As a result, the external host 91 is able to identify the transmitted packet and the response packet as packets transmitted and received in the same sequence of communication operations, thereby allowing the external host 91 to continue communication.

Whether or not information on the update of the DNS record reaches the external host 91 depends on each application operating in the same external host 91. For example, a packet transmitted from a first application that has not received the update of the DNS record reaches the internal host 4 through the pre-change address translation device, whereas a packet transmitted from a second application that has received the update of the DNS record reaches the internal host 4 through the post-change address translation device. In this case, a state occurs where even packets transmitted from the same external host 91 reach the internal host 4 through different address translation devices, depending on applications that have processed the packets.

According to the embodiment, the address translation table has a different entry with respect to each port of the external host 91. Accordingly, even if response packets corresponding to packets received through address translation devices 3 different depending on applications are mixed with each other, it is possible to perform address translation for these response packets while distinguishing these response packets from each other.

<6. Fourth Embodiment of Address Translation Device>

Next, another embodiment of the address translation device 3 will be described. In this embodiment, as an identifier identifying a state indicating that a packet from the external host 91 has transited through the address translation device 3, an internal IP address and an internal port that are assigned to the external host 91 by the address translation device 3 are used.

FIG. 24 is a diagram illustrating an example of an address translation table, according to a fourth embodiment. As depicted in FIG. 24, the address translation table 17 includes, as information elements, "the internal IP address of an internal host", "the external IP address of the internal host", "the internal IP address of an external host", "the internal port of the external host", "the external IP address of the external host", and "the external port of the external host". The information elements "the internal IP address of the internal host", "the external IP address of the internal host", "the external IP address of the external host", and "the external port of the external host" are the same as those in the address translation table 17 illustrated in FIG. 20.

The information element "the internal IP address of the external host" is an internal IP address that is assigned to the external host 91 by the address translation device 3. In addition, the information element "the internal port of the external host" is an internal port that is assigned, by the address translation device 3, to a port used by an application in the external host 91.

In the illustrated example, the address translation device 3 has assigned the external IP address "a1" to the first internal host 4*a* having the internal IP address "A". In addition, the illustrated example indicates that a packet whose destination is the first internal host 4*a* has been received from an application utilizing an external port "90" of the external host 91 having the external IP address "c". In addition, in the illustrated example, the address translation device 3 has assigned the internal IP address "PA12" and an internal port "p2" to the external host 91 and an application of the external host 91, respectively.

When there exist, in the address translation table 17, no entries that correspond to the addresses of a received packet, the identifier designation unit 27 acquires an unused IP internal address and an unused internal port from the pool address table, and assigns the acquired IP internal address and internal port to the external host 91.

FIG. 25 is a diagram illustrating an example of a pool address table, according to a fourth embodiment. The pool address table includes information elements "IP address", "port", and "usage flag". The combination of the information elements "IP address" and "port" indicates the combination of an internal IP address and a port that are allowed, by the address translation device 3, to be assigned to the external host 91 and the application thereof. The usage of the information element "usage flag" is the same as the example in FIG. 14.

In this embodiment, the internal address assigned to the external host by the address translation device allows response packets corresponding to the received packets that have transited through different address translation devices, to be distinguished from each other. Therefore, according to the fourth embodiment, even if response packets corresponding to the received packets that have transited through different address translation devices are mixed with each other after the update of the DNS record has reached the external host 91, address translation may be performed so that these response packets are distinguished from each other.

In the fourth embodiment, even if packets transmitted from different applications have transited through different address translation devices, response packets corresponding to these packets are distinguished from each other based on a port used by an application in the external host. Accordingly, even if response packets corresponding to the received packets that have transited through different address translation devices depending on applications are mixed with each other, address translation may be performed so that these response packets are distinguished from each other.

<7. Fifth Embodiment of Address Translation Device>

Next, another embodiment of the address translation device 3 will be described. In this embodiment, when the internal host 4 has moved, the pre-change address translation device 3 memorizes information on the internal host 4. When the pre-change address translation device 3 has added an entry for the internal host 4 to the address translation table 17 after the movement of the internal host 4, the pre-change address translation device 3 transmits, to the post-change address translation device 3, extracted NAT information storing therein the added entry. The post-change address translation device 3 adds, to the address translation table 17, the entry stored in the received extracted NAT information.

FIG. 26 is a diagram illustrating a configuration example of an address translation device, according to a fifth embodiment. The address translation device 3 includes a mobile host information generation unit 31 and a mobile host table 30. In accordance with the address translation program 15 stored in the auxiliary storage device 11, the processor 10 in FIG. 2 executes information processing due to the mobile host information generation unit 31. In addition, as the data 16, the mobile host table 30 is stored in the auxiliary storage device 11.

In addition, in the following description, a case will be described where the address translation device 3 according to the above-mentioned fifth embodiment includes the mobile host information generation unit 31 and the mobile host table 30. However, the address translation device 3 according to the first embodiment, the second embodiment, the third embodiment, or the fourth embodiment, which were described above, may also be configured to include the mobile host information generation unit 31 and the mobile host table 30.

Upon receiving movement information indicating the movement of an internal host 4 that has transmitted packets whose address translation has been performed by the address translation device 3, the mobile host information generation unit 31 of the address translation device 3 adds, to the mobile host table 30, an entry relating to the internal host 4, based on the received movement information.

FIG. 27 is a diagram illustrating an example of a mobile host table, according to a fifth embodiment.

As depicted in FIG. 27, the mobile host table 30 includes information elements "the internal address of an internal host", "the external address of the internal host", and "an address translation device". The information elements "the internal address of the internal host" and "the external address of the internal host" indicate the internal address and the external address of the internal host that has moved, respectively. The information element "the address translation device" indicates the address of the post-change address translation device 3. The illustrated example indicates that the first internal host 4*a* having the internal address "A" and the external address "a1" has moved and the post-change address translation device 3 is the second address translation device 3*b*.

When a new entry is added to the address translation table 17, the NAT information extraction unit 28 determines whether or not there exists, in the mobile host table 30, an entry that relates to the same internal host 4 for which the new entry is added to the address translation table 17. Namely, the NAT information extraction unit 28 determines whether or not an internal host 4 for which a new entry is added to the address translation table 17 is the internal host 4 that has moved.

When the internal host 4 for which a new entry is added to the address translation table 17 is the internal host 4 that has moved, the NAT information extraction unit 28 creates extracted NAT information storing therein the added new entry, and transmits the created extracted NAT information to the post-change address translation device 3. The NAT information addition unit 29 of the post-change address translation device 3 adds the received entry to the address translation table 17 thereof.

Figure 28:
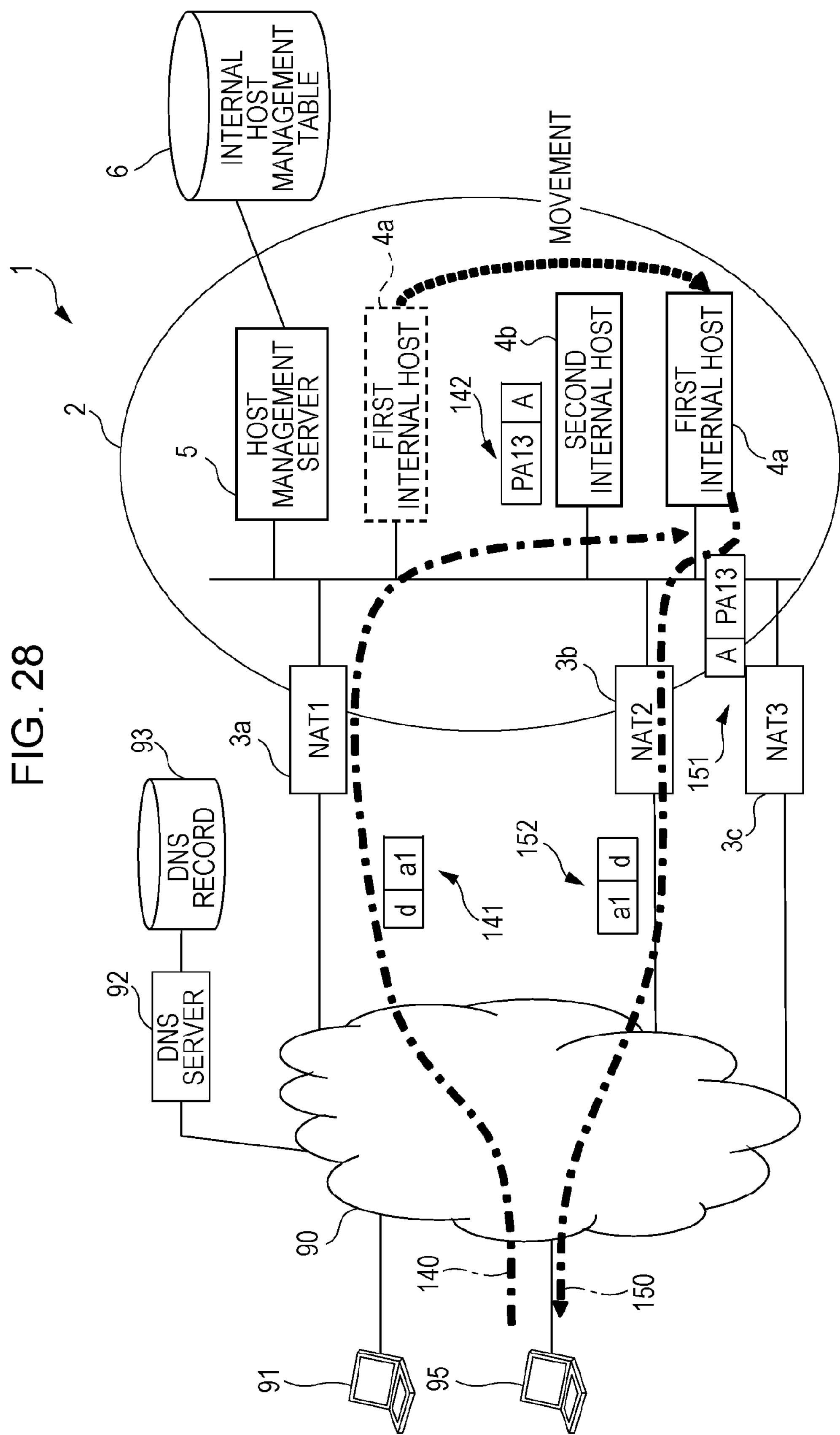
FIG. 28 is a schematic diagram illustrating an example of a packet flow, according to a fifth embodiment.

FIG. 28 is a schematic diagram illustrating an example of a packet flow, according to a fifth embodiment. FIG. 28 illustrates a packet flow that is performed when, after the movement of the first internal host 4*a*, an entry for the first internal host 4*a* is added to the address translation table 17 of the first address translation device 3*a* serving as the pre-change address translation device.

Now, a case will be considered where the update of the DNS record 93 due to the movement of the first internal host 4*a* has not reached an external host 95 having an external address "d". This external host 95 is an external host that has not established communication with the first internal host 4*a* yet before the update of the DNS record 93. When the first internal host 4*a* has moved, an entry for the first internal host 4*a* is added to mobile host table 30 of the first address translation device 3*a*.

A reference numeral 140 indicates a communication path through which a packet is transmitted from the external host 95 to the first internal host 4*a*. As illustrated by an arrow 141, the external host 95 transmits a packet having the transmission destination address "a1" and the transmission source address "d".

At this time, the first address translation device 3*a* receives the packet having the transmission destination address "a1" and the transmission source address "d" for the first time. In this case, the identifier designation unit 27 of the first address translation device 3*a* adds, to the address translation table 17, a new entry storing the internal address "A" and the external address "a1" of the first internal host 4*a* and the internal address "PA13" and the external address "d" of the external host 91.

FIG. 29A is a diagram illustrating an example of an address table, according to a fifth embodiment. FIG. 29A illustrates the state of the address translation table 17 of the first address translation device 3*a* to which the above mentioned new entry is added.

FIG. 29B is a diagram illustrating an example of an address table, according to a fifth embodiment. FIG. 29B illustrates the state of the address translation table 17 of the second address translation device 3*b* before the first address translation device 3*a* receives the packet indicated by the arrow 141. An entry at the first row in the address translation table 17 is an entry added by the second address translation device 3*b* when the second address translation device 3*b* has received, from the external network 90, a packet addressed to the second internal host 4*b*. An entry at the second row in the address translation table 17 is an entry that is added, by the second address translation device 3*b*, upon receiving extracted NAT information from the first address translation device 3*a* when the first internal host 4*c* has moved.

When an entry for the first internal host 4*a* has been added to the address translation table 17, the NAT information extraction unit 28 of the first address translation device 3*a* determines whether or not there exists an entry for the first internal host 4*a* in the mobile host table 30. In this case, since the entry for the first internal host 4*a* exists in the mobile host table 30, the NAT information extraction unit 28 transmits, to the second address translation device 3*b*, extracted NAT information storing therein the added entry. The second address translation device 3*b* adds the entry included in the received extracted NAT information to the address translation table 17. As a result, the state of the address translation table 17 of the second address translation device 3*b* shift to a state as illustrated in FIG. 29C.

The packet indicated by the arrow 141 is subjected to address translation by the external address translation unit 23 of the first address translation device 3*a*. In accordance with the address translation table 17, the external address translation unit 23 translates, into internal addresses, the external addresses of the first internal host 4*a* and the external host 91 stored in the received packet. As a result, the transmission destination address "a1" and the transmission source address "d" of the received packet are translated into the internal addresses "A" and "PA13", respectively. A packet after translation is indicated by an arrow 142. This packet is transmitted within the internal network 2 and reaches the first internal host 4*a*.

A reference numeral 150 indicates a transmission path of a response packet that is sent back, to the external host 95, from the first internal host 4*a* after movement, in the same sequence of communication operations in which the packet indicated by the arrow 141 has been transmitted. The first internal host 4*a* creates a response packet to be sent back to the external host 95, by swapping the transmission source address "PA13" and the transmission destination address "A" of the received packet indicated by an arrow 142. An arrow 151 indicates the created response packet.

The response packet reaches the second address translation device 3*b*. In accordance with the address translation table 17, the internal address translation unit 26 of the second address translation device 3*b* translates the internal address of the received response packet to an external address. In the address translation table 17, there exists an entry that matches the combination of the internal address "A" of the first internal host 4*a* serving as the transmission source address of the response packet and the internal address "PA13" of the external host 95 serving as the transmission destination address of the response packet. Therefore, the internal address translation unit 26 translates the transmission source address "A" and the transmission destination address "PA13" of the response packet into the external addresses "a1" and "d", respectively. The response packet after translation is indicated by an arrow 152. In this way, the transmission source address after translation becomes the external address "a1" assigned to the first internal host 4*a* by the first address translation device 3*a*.

As described above, in some cases, after the movement of the internal host 4, an entry for the internal host 4 is added to the address translation table 17 of the pre-change address translation device 3. According to the fifth embodiment, it is possible to add, to the address translation table 17 of the post-change address translation device 3, the same entry as an entry added to the address translation table 17 of the pre-change address translation device 3 after the movement of the internal host 4. This allows the internal host 4 to continue communication with the external host 95 that has not established communication with the internal host 4 before the update of the DNS record 93 and has not received the update of the DNS record 93 yet.

<8. Sixth Embodiment of Address Translation Device>

Next, another embodiment of the address translation device 3 will be described. In this embodiment, a deletion time is set in an entry that is added to the address translation table 17 upon receiving the extracted NAT information.

FIG. 30 is a diagram illustrating an example of an address translation table, according to a sixth embodiment. The address translation table 17 includes, as information elements, "the internal address of an internal host", "the external address of the internal host", "the internal address of an external host", "the external address of the external host", and "a deletion time".

The information elements "the internal address of the internal host", "the external address of the internal host", "the internal address of the external host", and "the external address of the external host" are the same as those in the address translation table 17 illustrated in FIG. 13. The information element "the deletion time" specifies a time when this entry is to be deleted. The example depicted in FIG. 30 indicates that an entry in which the information elements "the internal address of the internal host", "the external address of the internal host", "the internal address of the external host", and "the external address of the external host" are set at "A", "a1", "PA12", and "c", respectively, is to be deleted at 9:21 a.m. on Mar. 31, 2011.

In the following description, a case will be described where a deletion time is set in an entry of the address translation table 17 of the address translation device 3 according to the above-mentioned fifth embodiment. However, the similar deletion time may be set in the first embodiment, the second embodiment, the third embodiment, or the fourth embodiment that were described above.

When the internal host 4 has moved, the host management server 5 specifies, using movement information, the time to live (TTL) of the entry that is added to the address translation table 17 upon receiving extracted NAT information.

FIG. 31 is a diagram illustrating an example of movement information, according to sixth embodiment. The movement information includes the identifier of the internal host 4 to move, the internal address of the internal host 4 to move, the address of the post-change address translation device 3, and TTL specification.

The NAT information extraction unit 28 of the pre-change address translation device 3 creates extracted NAT information so that the extracted NAT information includes the specified TTL specification. The NAT information addition unit 29 of the post-change address translation device 3 determines the deletion time by adding a value of the TTL to a current time. The NAT information addition unit 29 sets the determined deletion time in the entry that is added to the address translation table 17 upon receiving the extracted NAT information. Alternatively, the NAT information extraction unit 28 may determine the deletion time, and creates extracted NAT information so that the created extracted NAT information includes the determined deletion time.

When the transmission of the update of the DNS record has completed, the entry that was added to the address translation table 17 upon receiving the extracted NAT information becomes unnecessary. According to this embodiment, since a time to live is set to the entry that was added to the address translation table 17 upon receiving the extracted NAT information, it is possible to delete unnecessary entries from the address translation table 17, thereby avoiding the enlargement of the address translation table 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for translating an address of a packet transferred between networks, the apparatus comprising:

a processor to:

receive address information from another apparatus, the another apparatus being configured to translate a destination address of a first packet that is transferred from an external communication device in an external network to an internal communication device in an internal network through the external network, from a first external-network address that has been assigned to the internal communication device using an addressing scheme for the external network, to a first internal-network address that has been assigned to the internal communication device using an addressing scheme for the internal network, the address information including the first external-network address assigned to the internal communication device and identifier information for identifying the external communication device, and translate a source address of a second packet received from the internal communication device into one of the first external-network address included in the address information and a second external-network address that is assigned by the apparatus to the internal communication device using an addressing scheme for the external network, depending on whether a destination address of the second packet corresponds to the external communication device identified by the identifier information to identify a first packet and a second packet as packets transferred and received in the same sequence of communication operations; and a memory to store information on a correspondence relationship between the first and second external-network addresses and the first internal-network address.

2. The apparatus of claim 1, wherein the address information includes the first internal-network address assigned to the internal communication device; and the processor translates, when a combination of the destination and source addresses of the second packet corresponds to a combination of the external and internal communication devices that are respectively identified by the identifier information and the first internal-network address included in the address information, a source address of the second packet received from the internal communication device into the first external-network address included in the address information.

3. The apparatus of claim 1, wherein the identifier information includes a second internal-network address that is assigned to the external communication device using an addressing scheme for the external network.

4. The apparatus of claim 1, wherein the identifier information includes a port number and an internet protocol address that have been assigned to the external communication device using an addressing scheme for the external network.

5. The apparatus of claim 1, wherein the identifier information includes a port number and an internet protocol address that have been assigned to the external communication device using an addressing scheme for the internal network.

6. The apparatus of claim 1, wherein the processor receives the address information from the another apparatus when a transit connection point via which a packet is transferred between the internal and external communication devices is changed from the another apparatus to the apparatus;

upon receiving, from the internal communication device, the second packet whose destination address corresponds to the external communication device from which the internal communication device has received the first packet via the another apparatus, the processor translates a source address of the second packet from the first internal-network address to the first external-network address, based on the first external-network address and the identifier information included in the received address information; and the processor transmits, to the external communication device, the second packet having a source address of the first external-network address, so as to enable the external communication device to identify the second packet as a packet transmitted from a destination of the first packet.

7. A system for translating an address of a packet transferred through an external network, the system comprising:

an internal network communicably coupled to the external network via a plurality of connection points;

a first address translation device to translate a destination address of a first packet that is transferred from an external communication device in the external network to an internal communication device in the internal network through the external network via a first one of the plurality of connection points; and a second address translation device to translate a source address of a second packet that is transferred from the internal communication device to the external communication device via a second one of the plurality of connection points through the external network, wherein the first address translation device being configured to:

translate the destination address of the first packet, from a first external-network address that has been assigned to the internal communication device using an addressing scheme for the external network, to a first internal-network address that has been assigned to the internal communication device using an addressing scheme for the internal network, and transmit, to the second address translation device, address information including the first external-network address and identifier information for identifying the external communication device; and the second address translation device being configured to:

receive the address information from the first address translation device, and translate the source address of the second packet received from the internal communication device into one of the first external-network address included in the address information and a second external-network address that has been assigned by the second address translation device to the internal communication device using an addressing scheme for the external network, depending on whether the destination address of the second packet corresponds to the external communication device identified by the identifier information to identify a first packet and a second packet as packets transferred and received in the same sequence of communication operations.

8. A method being performed by a system including first and second address translation devices for translating an address of a packet transferred between networks, the method comprising:

translating, by the first address translation device, a destination address of a first packet that is transferred from an external communication device in an external network to an internal communication device in an internal network through the external network, from a first external-network address that has been assigned to the internal communication device using an addressing scheme for the external network, to a first internal-network address that has been assigned to the internal communication device using an addressing scheme for the internal network;

transmitting, by the first address translation device, to the second address translation device, address information including the first external-network address and identifier information for identifying the external communication device;

receiving, by the second address translation device, the address information from the first address translation device; and translating, by the second address translation device, a source address of a second packet received from the internal communication device into one of the first external-network address included in the address information and a second external-network address that has been assigned by the second address translation device to the internal communication device using an addressing scheme for the external network, depending on whether a destination address of the second packet corresponds to the external communication device identified by the identifier information to identify a first packet and a second packet as packets transferred and received in the same sequence of communication operations.

9. A method being performed by an apparatus for translating an address of a packet transferred between networks, the method comprising:

receiving address information from another apparatus, the another apparatus being configured to translate a destination address of a first packet that is transferred from an external communication device in an external network to an internal device in an internal network through the external network, from a first external-network address that has been assigned to the internal communication device using an addressing scheme for the external network, to an internal address that has been assigned to the internal communication device using an addressing scheme for the internal network, the address information including the external-network address assigned to the internal communication device and identifier information for identifying the external communication device, and translating a source address of a second packet received from the internal communication device into one of the first external-network address included in the address information and a second external-network address that has been assigned by the apparatus to the internal communication device using an addressing scheme for the external network, depending on whether a destination address of the second packet corresponds to the external communication device identified by the identifier information to identify a first packet and a second packet as packets transferred and received in the same sequence of communication operations.

* * * * *